(12) United States Patent
Taylor et al.

(10) Patent No.: US 10,242,345 B2
(45) Date of Patent: *Mar. 26, 2019

(54) AUTOMATIC INTERVIEW QUESTION RECOMMENDATION AND ANALYSIS

(71) Applicant: HireVue, Inc., South Jordan, UT (US)

(72) Inventors: Benjamin Taylor, Lehi, UT (US); Loren Larsen, Lindon, UT (US)

(73) Assignee: HireVue Inc., South Jordan, UT (US)

( * ) Notice: Subject to any disclaimer, the term of this patent is extended or adjusted under 35 U.S.C. 154(b) by 294 days.

This patent is subject to a terminal disclaimer.

(21) Appl. No.: 15/164,249

(22) Filed: May 25, 2016

(65) Prior Publication Data

US 2019/0034881 A1 Jan. 31, 2019

Related U.S. Application Data

(63) Continuation of application No. 14/535,205, filed on Nov. 6, 2014, now Pat. No. 9,378,486.

(60) Provisional application No. 61/954,385, filed on Mar. 17, 2014.

(51) Int. Cl.

| | | |
|---|---|---|
| *G06Q 10/10* | (2012.01) | |
| *G06Q 10/06* | (2012.01) | |
| *G06Q 30/08* | (2012.01) | |
| *G06Q 10/00* | (2012.01) | |
| *G06Q 30/02* | (2012.01) | |
| *G06F 17/30* | (2006.01) | |

(52) U.S. Cl.
CPC ..... *G06Q 10/1053* (2013.01); *G06F 17/3053* (2013.01); *G06F 17/30598* (2013.01); *G06Q 10/105* (2013.01)

(58) Field of Classification Search
CPC .................. G06Q 10/105; G06Q 10/1053
USPC .................. 705/1.1–912, 320, 321
See application file for complete search history.

(56) References Cited

U.S. PATENT DOCUMENTS

| | | |
|---|---|---|
| 6,098,034 A | 8/2000 | Razin et al. |
| 2002/0055866 A1 | 5/2002 | Dewar |
| 2002/0103805 A1 | 8/2002 | Canner et al. |
| 2005/0273350 A1 | 12/2005 | Scarborough et al. |
| 2006/0031812 A1 | 2/2006 | Olson et al. |
| 2008/0300966 A1 | 12/2008 | Gocha, Jr. |
| 2009/0254401 A1 | 10/2009 | Blanchard |
| 2009/0299993 A1 | 12/2009 | Novack |

(Continued)

OTHER PUBLICATIONS

International Search Report and Written Opinion dated Jun. 15, 2015, for application No. PCT/US2015/020789.

(Continued)

*Primary Examiner* — Jonathan P Ouellette
(74) *Attorney, Agent, or Firm* — Lowenstein Sandler LLP

(57) ABSTRACT

Described herein are methods and systems for interview question or prompt recommendation and analysis to improve the quality and efficacy of subsequent evaluation campaigns by combining data sets are described herein. In one method, processing logic selects a first prompt from a first data set of a first candidate evaluation campaign and a second prompt from a second data set of a second candidate evaluation campaign. The processing logic determines whether a degree of similarity between the first prompt and the second prompt exceeds a threshold and combines data from the first data set with data from the second data set to create a combined data set associated with the first prompt and with the second prompt based on the determination.

18 Claims, 13 Drawing Sheets

(56) References Cited

U.S. PATENT DOCUMENTS

2009/0319289 A1 12/2009 Pande
2012/0109838 A1 5/2012 Younger et al.

OTHER PUBLICATIONS

Previsor, HireVue "PreVisor and HireVue Partner to Offer New Streamlined Interviewing Solution Combining Assessment Science and Online Video Technology", Business Wire, HR Technology Conference 2010, Sep. 28, 2010. pp. 1-2.
International Preliminary Report on Patentability dated Sep. 20, 2016, on Application No. PCT/US2015/020789.

FIG. 4

AUTOMATIC INTERVIEW QUESTION RECOMMENDATION AND ANALYSIS

RELATED APPLICATIONS

This application is a continuation application of U.S. patent application Ser. No. 14/535,205 filed Nov. 6, 2014, which claims the benefit of U.S. Provisional Application No. 61/954,385, filed Mar. 17, 2014, the entire contents of both are hereby incorporated by reference.

BACKGROUND

Finding and hiring employees is a task that impacts most modern businesses. It is important for an employer to find employees that "fit" open positions. Criteria for fitting an open position may include skills necessary to perform job functions. Employers may also want to evaluate potential employees for mental and emotional stability, ability to work well with others, ability to assume leadership roles, ambition, attention to detail, problem solving, personality, etc.

However, the processes associated with finding employees can be expensive and time consuming for an employer. Such processes can include evaluating resumes and cover letters, telephone interviews with candidates, in-person interviews with candidates, drug testing, skill testing, sending rejection letters, offer negotiation, training new employees, etc. A single employee candidate can be very costly in terms of man-hours needed to evaluate and interact with the candidate before the candidate is hired.

Computers and computing systems can be used to automate some of these activities. For example, many businesses now have on-line recruiting tools that facilitate job postings, resume submissions, preliminary evaluations, etc. Additionally, some computing systems include functionality for allowing candidates to participate in "virtual" on-line interviews.

The job of interviewers and candidate reviewers is to determine if candidates are skilled and have the qualifications required for a particular job. In the process of doing this, they compare and contrast the qualifications of candidates—often reviewing and comparing candidate responses to particular questions or tasks. While computing tools have automated interview response gathering, there is still a lot of effort spent in evaluating the numerous responses that may be submitted in large quantities of applications for a single opening.

The subject matter claimed herein is not limited to embodiments that solve any particular disadvantages or that operate only in environments such as those described above. Rather, this background is only provided to illustrate one exemplary technology area where some embodiments described herein may be practiced.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 4 is another exemplary graphical user interface for viewing digital interviews according to one embodiment showing a second campaign.

Figure 1:
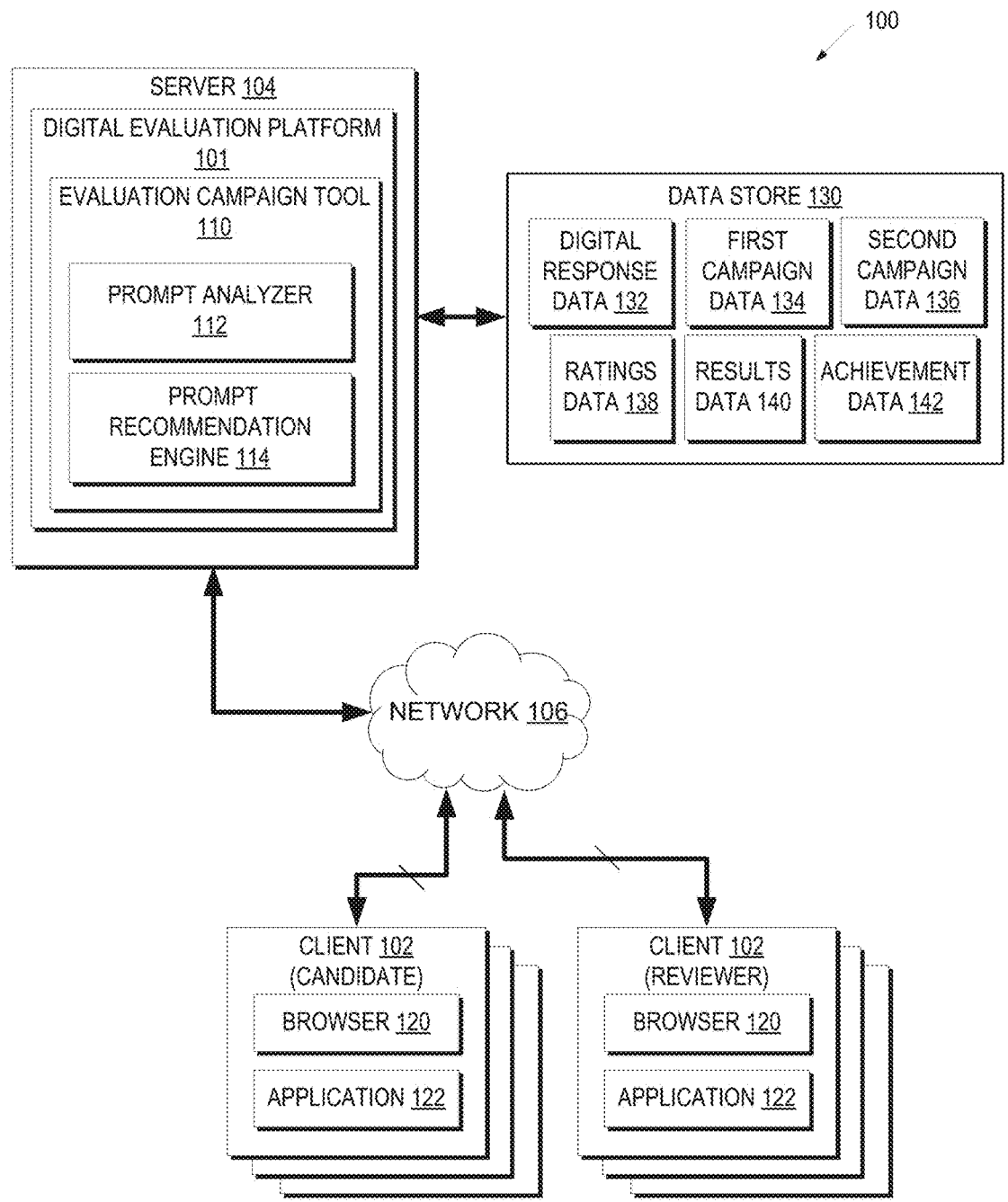
FIG. 1 is a block diagram of an exemplary network architecture in which embodiments of an evaluation campaign tool may operate.

Some aspects of these figures may be better understood by reference to the following Detailed Description.

DETAILED DESCRIPTION

With the ability to recruit for positions nationally and even internationally using the Internet, the number of qualified candidates applying for a given job can be expensive and time consuming to evaluate. For more technical positions, subject-matter experts are used for the evaluation and screening of candidates rather than focusing on regular job duties. With the adoption of digital video interviewing, the time needed to evaluate candidates is reduced, however, the problem of having too many candidates to filter through still remains.

Digital interviews or other digital evaluations may include recording and evaluating responses of applicants to a series of prompts or questions. Examples of such digital evaluations may include a pitch for investment funding or a grant, an admissions interview, a job performance evaluation, and other presentations or interactions meriting assessment and comparison. While this disclosure includes several examples directed to digital evaluations conducted to fill job positions, the principles and features may be equally applied to these other contexts as well. The series of prompts may be selected from a list provided by a digital evaluation platform or may be manually entered into a digital evaluation platform by a company or other organization that is performing the evaluation campaign, a process of digital evaluation to select one or more candidates from a larger pool. The prompts may be different from campaign to campaign as one company selects different prompts for their campaign than another.

Candidates' responses to those prompts can be captured as digital data along with other information (such as writing samples, code samples, resumes, curricula vitae, and/or other portfolio items) provided by the candidate and later reviewed and rated by an evaluator. The evaluator may make an evaluation decision on the hiring, investing, admission, etc., with respect to the candidate being evaluated and enter that decision as an evaluation result into the digital evaluation platform. The data associated with an evaluation campaign may include digital response data, ratings data, results data, and other data. In some instances, achievement data may also be included. The achievement data may include data describing achievements of a candidate prior to the evaluation or after the evaluation. For example, the achievement data may include job performance evaluation data collected well after an evaluation decision has been made.

The data associated with an evaluation campaign may be used to improve subsequent evaluation campaigns. When using the data to improve other evaluation campaigns, a larger more robust data set may provide more accurate information then a smaller data set. By combining the data set of one campaign with the data set of another campaign, a larger data set may be produced. This larger data set may be used to generate more accurate models for use in evaluating large numbers of candidates. For example, using the larger data set may provide more accurate indications of how well a particular prompt, or a rating of a response to a particular prompt, is correlated to a decision to hire a candidate in a particular campaign. However, if the campaigns and the prompts used in those campaigns are not sufficiently related, the combined data set, although larger, may be too noisy to produce additional insight. In such situations, the combined data set may be less useful that then separate data sets.

Methods and systems for interview question or prompt recommendation and analysis to improve the quality and efficacy of subsequent evaluation campaigns by combining data sets are described herein. In the following description, numerous details are set forth. In one embodiment, an evaluation campaign tool that manages and analyzes campaign data. The evaluation campaign tool identifies prompts from the data sets of different evaluation campaigns and determines a degree of similarity between those prompts. When prompts having more than a threshold degree of similarity are found, data from each of the different evaluation campaigns may be combined to provide a larger, more robust data set. As used herein, an evaluation campaign may be a hiring process for a particular job position, an admissions interview process, an investment pitch, or another process is which a plurality of candidates are to be evaluated as part of a selection process. The evaluation campaign tool receives multiple prompts used in a first evaluation campaign and multiple prompts used in the evaluation of candidates in a second campaign. Each evaluation campaign supported by a digital evaluation platform may include ratings data, results data, and/or achievement data. By combining the data sets of the first and second evaluation campaign a more robust data set may be created from which additional insights may be obtained.

For example, if a first software company and a second software company both have evaluation campaigns for developer positions, combining the data sets from these evaluation campaigns may provide additional insights that the data sets of either software company is too small or too noisy to provide statistically valid predictions. However, if one company has an evaluation campaign for a developer position and another company (or the same company) has an evaluation campaign for a sales position, combining evaluation ratings, results data, and other data may not provide useful information that may be used to predict the result of a candidate being evaluated. Efforts may be made to ensure that data from unrelated positions are not combined. The prompts used in campaigns to fill comparable positions may include some similar prompts. By identifying the similar prompts, data associated with those similar prompts, such as ratings data, evaluation results data, and other data, may be combined and used together to the greatest effect. These combined data sets may be used to enable subsequent tailoring and improvement of campaigns by providing greater statistical insights. Prompts presented in the campaign for the developer position and other prompts presented in the campaign for the sales position may have very little overlap, such that combining data from each of the campaigns may not provide as much useful information. Embodiments of the evaluation campaign tool may also use the combined data set in providing prompt recommendations for future campaigns that include more decisive and/or predictive prompts.

In some instances in this description, well-known structures and devices are shown in block diagram form, rather than in detail, in order to avoid obscuring the embodiments of the present invention. It will be apparent, however, to one of ordinary skill in the art having the benefit of this disclosure, that embodiments of the present invention may be practiced without these specific details.

Embodiments described herein can be used to address at least two identified problems of candidate selection, namely large candidate pools and screening accuracy. The embodiments described herein provide solutions to these problems by providing more robust data sets. A smaller company that interviews a smaller number of people for a particular position may be able to benefit from data derived from the campaign of a larger company evaluating a larger number of candidates for a similar position. Additionally, the use of the combined data sets may enable the digital evaluation platform to provide more decisive prompts as templates when a company sets up a new campaign in the digital evaluation platform.

FIG. 1 is a block diagram of a network architecture 100 in which embodiments of an evaluation campaign tool 110 may operate. The network architecture 100 may include multiple client computing systems 102 coupled to a server computing system 104 via a network 106 (e.g., a public network such as the Internet, a private network such as a local area network (LAN), or a combination thereof). The network 106 may include the Internet and network connections to the Internet. Alternatively, the server 104 and the clients 102 may be located on a common LAN, personal area network (PAN), campus area network (CAN), metropolitan area network (MAN), wide area network (WAN), wireless local area network, cellular network, virtual local area network, or the like. The server computing system 104 (also referred to herein as server 104) may include one or more machines (e.g., one or more server computer systems, routers, gateways) that have processing and storage capabilities to provide the functionality described herein.

The server computing system 104 may execute an evaluation campaign tool 110. The evaluation campaign tool 110 can perform various functions as described herein and may include a prompt analyzer 112 to analyze prompts from multiple campaigns hosted by a digital evaluation platform 101 and a prompt recommendation engine 114 to recommend prompts in subsequently created evaluation campaigns. The features of the evaluation campaign tool 110, including the prompt analyzer 112 and the prompt recommendation engine 114 are described in more detail herein. The evaluation campaign tool 110 can be implemented as part of the digital evaluation platform 101, such as the digital interviewing platform developed by HireVue, Inc., or may be implemented in another digital evaluation platform, such as an investment evaluation platform, an admission evaluation platform, or the like.

The evaluation campaign tool 110 can be implemented as a standalone system that interfaces with the digital evaluation platform 101 or other systems. It should also be noted that in this embodiment, the server computing system 104 implements the evaluation campaign tool 110, but one or more of the clients 102 may also include client modules of the evaluation campaign tool 110 that can work in connection with, or independently from the functionality of the evaluation campaign tool 110 as depicted on the server computing system 104.

The client computing systems 102 (also referred to herein as "clients 102" or "client 102") may each be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, wearable computing devices or the like. The client 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 120 and one or more applications 122. The clients 102 may include a microphone and a video camera to record responses as digital data. For example, the clients 102 may record and store video responses and/or stream or upload the recorded responses to the server 104 for capture and storage. In one embodiment, the clients 102 access the digital evaluation platform 101 via the browser 120 to record responses. Some recorded responses may include audio, video, code or text, other work samples, and/or combinations thereof. In such embodiments, the digital evaluation platform 101 is a web-based application or a cloud computing system that presents user interfaces to the client 102 via the browser 120.

Similarly, one of the applications 122 can be used to access the digital evaluation platform 101. For example, a mobile application (referred to as "app") can be used to access one or more user interfaces of the digital evaluation platform 101. The digital evaluation platform 101 can be one or more software products that facilitate the digital evaluation process. For example, in some cases, the client 102 is used by a candidate (or interviewee) during a digital interview. The digital evaluation platform 101 can capture digital response data 132 from the candidate and store the data in a data store 130. The digital response data 132 may include data uploaded by the candidate, audio captured during the interview, video captured during the interview, data submitted by the candidate before or after the interview, or the like. As illustrated herein, the digital response data 132 includes at least recorded responses in the form of video captured during the interview.

The clients 102 can also be used by an evaluation campaign manager to create and manage one or more evaluation campaigns and to review, screen, and select candidates and their associated response data. For example, the evaluation campaign manager may be a member of a human resources division of a company that has one or more open positions to fill through the digital evaluation platform 101. As another example, the evaluation campaign manager may be a venture capital or private equity investor receiving investment pitches through the digital evaluation platform 101. The campaign manager can access the digital evaluation platform 101 via the browser 120 or the application 122 as described above. In some embodiments, the application 122 may provide at least some of the features described herein in connection with the digital evaluation platform 101. For example, the application 122 may provide the evaluation campaign tool 110, when a campaign manager uses the client 102. The user interfaces presented to the campaign manager by the digital evaluation platform 101 are different than the user interfaces presented to the candidates. The user interfaces presented to the campaign manager may allow for selecting and/or entering one or more prompts to be presented to candidates in the evaluation process. The user interfaces may also permit the campaign manager or others working with the campaign manager to access the digital response data 132 for reviewing and selecting the candidates.

The clients 102 may also be used by other reviewers or evaluators who are not authorized to create and manage evaluation campaigns, but may review, screen, and select candidates by accessing their associated response data. The evaluators may provide ratings of the responses and may also provide evaluation decisions or recommendations to more senior evaluators or to the campaign manager.

As illustrated in FIG. 1, the data store 130 may represent one or more data repositories on one or more memory devices. The data store 130 may be a database or any other organized collection of data. The data store 130 may store the digital response data 132 as well as data for multiple campaigns. As shown in FIG. 1, the data store 130 includes data from a first campaign (referred to as first campaign data 134) and data from a second campaign (referred to as second campaign data 136). The campaign data may include prompts used in each of the campaigns, descriptions of the position or opportunity associated with the campaign, settings of the digital evaluation platform 101 to be applied to each campaign, etc. The data store 130 may also include ratings data 138, results data 140, and achievement data 142. The ratings data 138 and the results data 140 may be organized by campaign, such that the ratings data for a first campaign may be identified and accessed separately from the ratings data for a second campaign. Combined data sets may also be included in the ratings data 138 (or the results data 140) such that ratings data (or results data) for the first and second campaigns is provided together as a combined data set. The achievement data 142 may include information obtained from candidates prior to, during, and/or after the evaluation process. Such information may include academic performance information, such as a grade point average, test scores, funding raised to date, work performance review information, etc.

In the data store 130, the various kinds of data may be accessed in a number of different ways. For example, data may be aggregated and presented by the digital evaluation platform 101 by campaign, by candidate, by the organization sponsoring a campaign. Additionally, restrictions may be placed on data, such that one company cannot access data associated with campaigns of another company.

In the depicted embodiment, the server computing system 104 may execute the digital evaluation platform 101, including the evaluation campaign tool 110 for facilitating analyzing prompts from multiple campaigns and recommending prompts for new campaigns. The evaluation campaign tool 110, executing in connection with the digital evaluation platform 101 may facilitate the combination of data sets from multiple campaigns to provide more robust data sets. In some embodiments, when data sets from multiple campaigns are combined, the data sets may be filtered or "scrubbed" to remove certain information, such as information that may identify an individual candidate or that may identify an individual campaign manager, etc.

The server 104 may include web server functionality that facilitates communication between the clients 102 and the digital evaluation platform 101 to conduct digital interviews as part of an evaluation campaign or review, manage ongoing evaluation campaigns, and create new campaigns. Alternatively, the web server functionality may be implemented on a machine other than the machine running the evaluation campaign tool 110. It should also be noted that the functionality of the digital evaluation platform 101 for recording the digital response data 132 can be implemented on one or more servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

Figure 2:
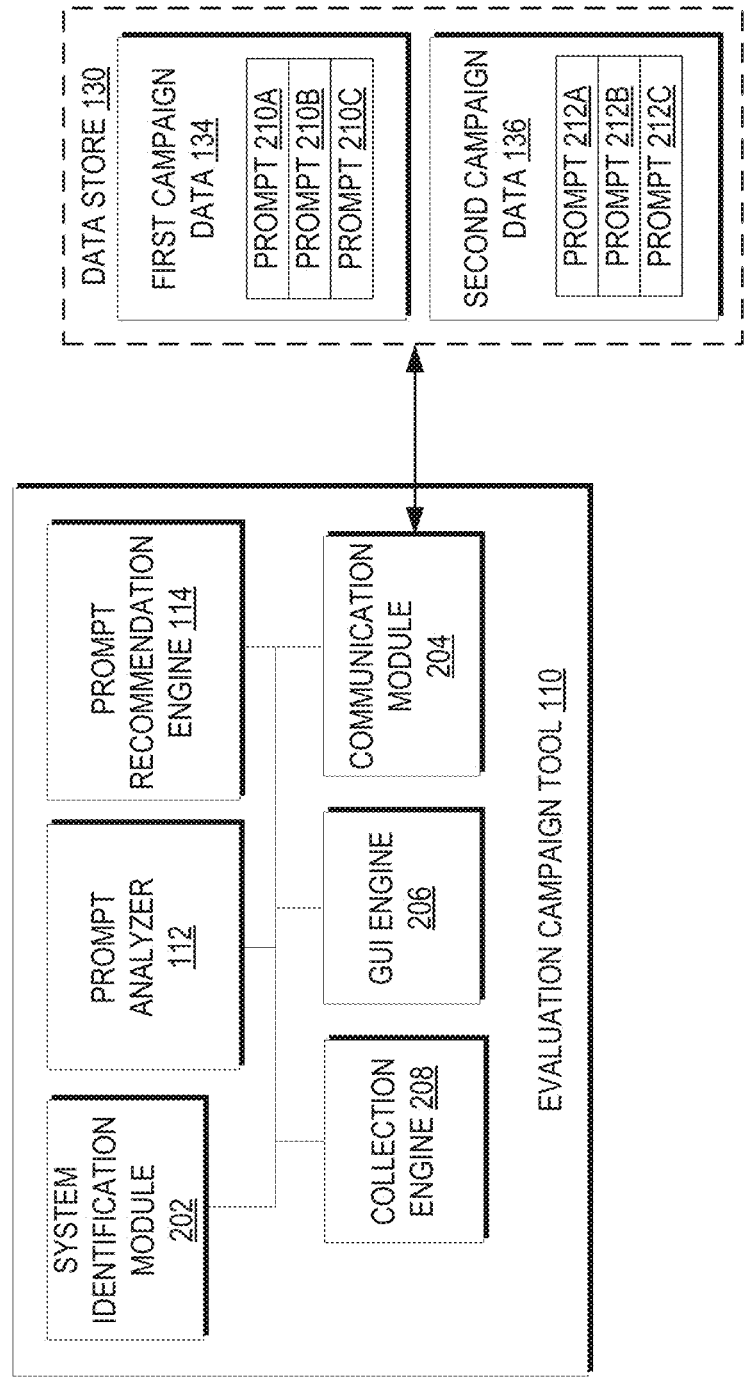
FIG. 2 is a block diagram of an evaluation campaign tool according to one embodiment.

FIG. 2 is a block diagram providing additional detail of the evaluation campaign tool 110 of FIG. 1, according to one embodiment. The evaluation campaign tool 110 can be implemented as processing logic comprising hardware (circuitry, dedicated logic, etc.), software (such as is run on a general purpose computing system or a dedicated machine), firmware (embedded software), or any combination thereof. In the depicted embodiment, the evaluation campaign tool 110 includes a system identification module 202 for machine learning and building predictive models, the prompt analyzer 112, the prompt recommendation engine 114, a communication module 204, a graphical user interface (GUI) engine 206, and a collection engine 208. The components of the evaluation campaign tool 110 may represent modules that can be combined together or separated into further modules, according to some embodiments.

As illustrated in FIG. 2, the system identification module 202 may be receive evaluation data, including prompts with associated ratings and evaluation results, to model how a prompt is related to the result of an evaluation. For example, one particular prompt in a campaign may be most closely correlated with the evaluation decisions (e.g., who is offered the position and who is not). A larger data set, such as may be obtained by combining multiple data sets, may enable the system identification module 202 to provide better models for use in evaluating candidates. The communication module 204 of the evaluation campaign tool 110 may enable the tool 110 to communicate with the data store 130 to permit the collection engine 208 to selectively retrieve campaign data stored in the data store 130. The communication module 204 may further enable communication with the server 104, other servers, and/or the clients 102. The data store 130, as shown in FIG. 2, includes first campaign data 134 and second campaign data 136. Some of the data included in the first and second campaign data is shown. The first campaign data 134 includes multiple prompts shown as prompts 210A, 210B, and 210C. Similarly, the second campaign data 136 includes prompts 212A, 212B, and 212C. These prompts may be collected for analysis by the collection engine 208. In some embodiments, the first and second campaign data includes many more prompts than shown in FIG. 2.

Figure 3:
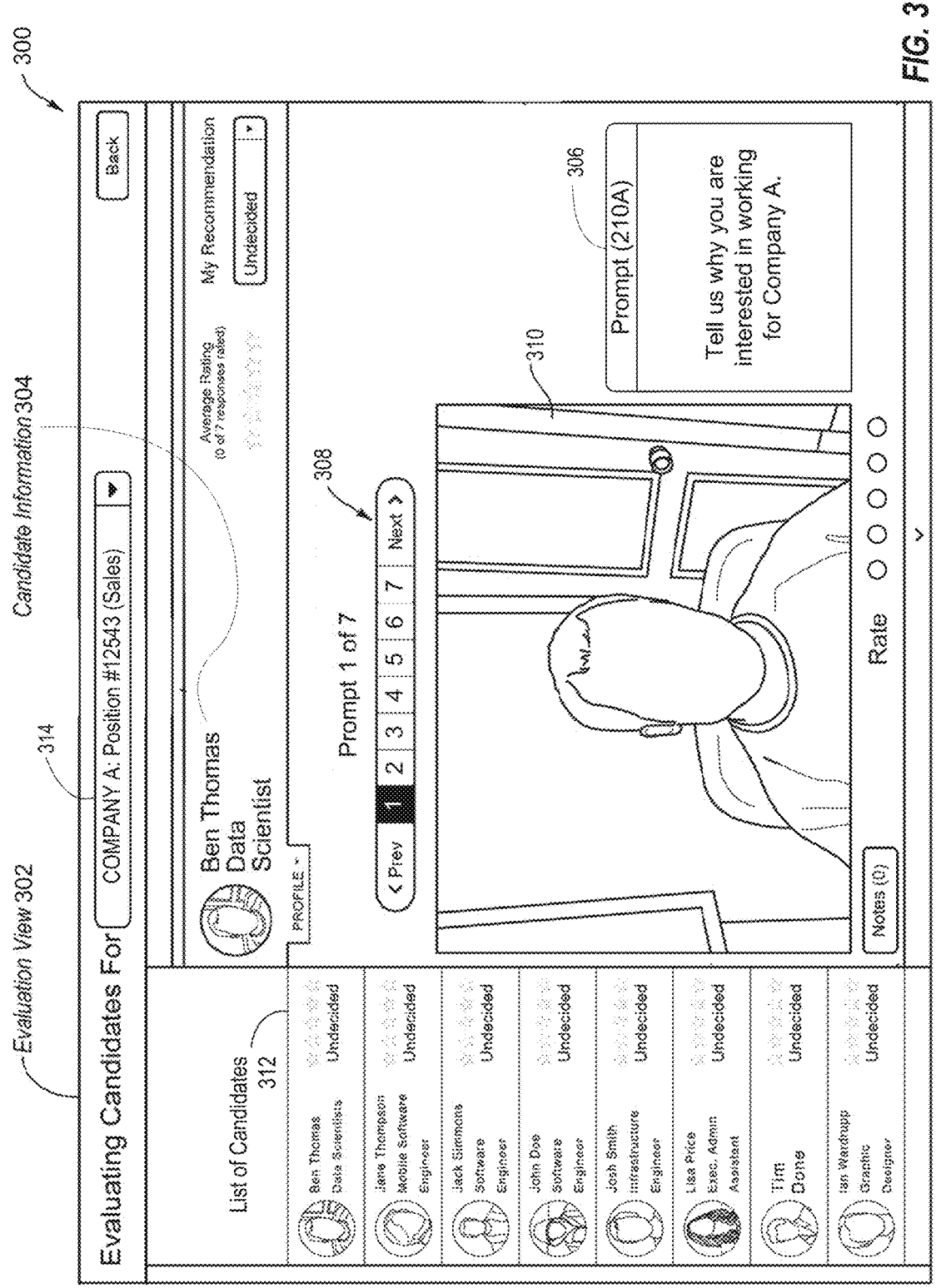
FIG. 3 is an exemplary graphical user interface for viewing digital interviews according to one embodiment showing a first campaign.
Figure 4:
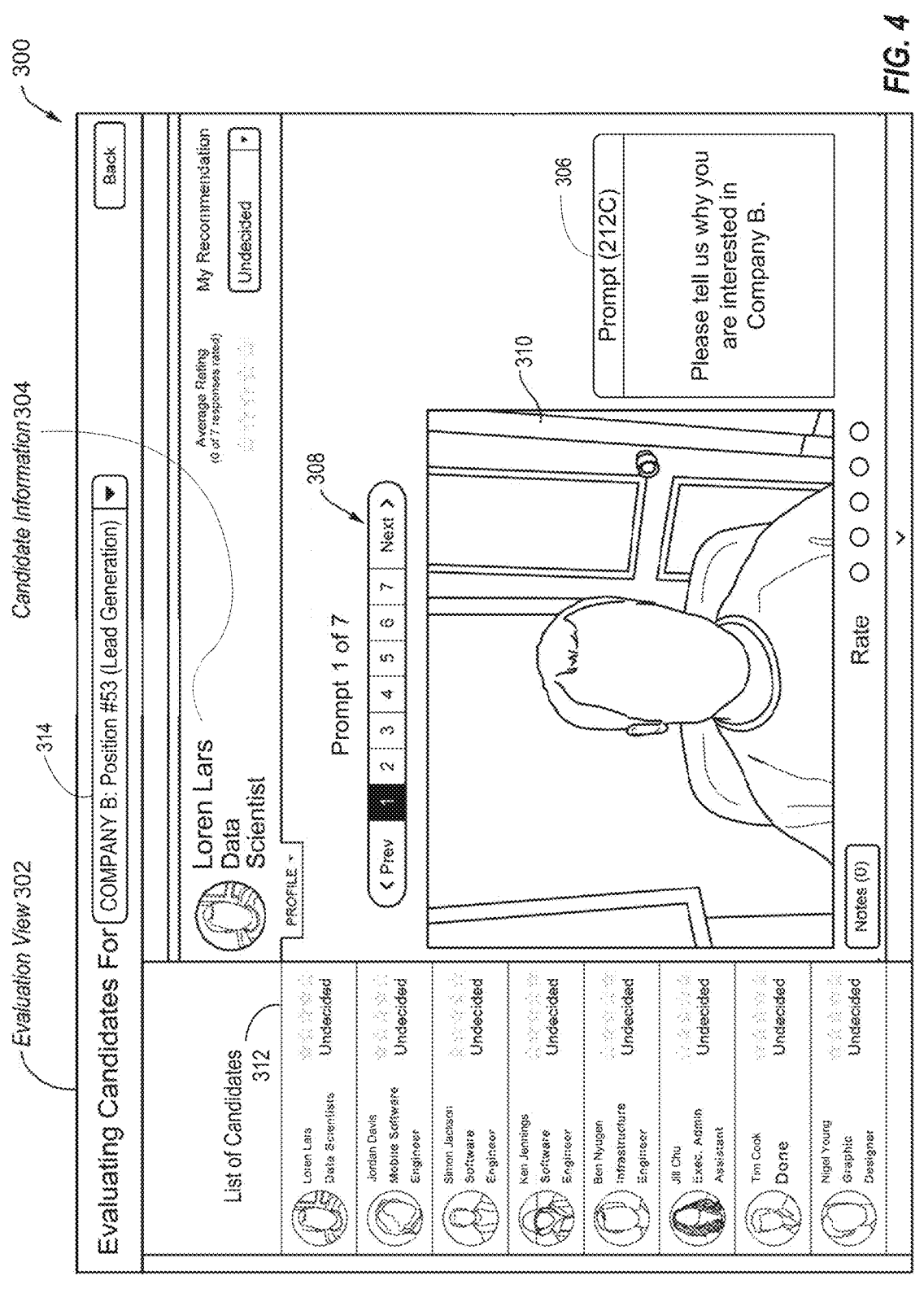

Embodiments of graphical user interfaces, which may be provided by the GUI engine 206 for campaigns associated with the first campaign data 134 and the second campaign data 136, are illustrated in FIGS. 3 and 4, respectively. FIGS. 3 and 4 illustrate an exemplary user interface 300 provided by the digital evaluation platform 101 for viewing recorded responses and other information obtained in a campaign and for providing ratings and results data as part of the evaluation campaign. The user interface 300 may be an evaluation view 302 of a digital evaluation platform 101. The evaluation view 302 includes candidate information 304, a prompt element 306, a response navigation element 308, a media panel 310, and a list of candidates 312 that have been or have yet to be evaluated as part of an evaluation campaign. The evaluation view 302 of the user interface 300 also includes a campaign information element 314 that displays information regarding the campaign and permits the campaign manager to select among campaigns being managed. The campaign information element 314 may include information regarding a sponsor of the campaign and information regarding the position the campaign is intended to fill.

In FIG. 3, the evaluation view 302 displays information associated with the first campaign. This first campaign is a campaign managed by "Company A" for a position in sales. The first campaign includes data stored in the data store 130, such as prompts 210A, 210B, and 210C, as shown in FIG. 2. In the evaluation view 302 of FIG. 3, prompt 210A is displayed in the prompt element 306. The media panel 310 may display a recorded video response of the candidate "Ben Thomas" to the prompt 210A, shown in the prompt element 306. In FIG. 4, the evaluation view 302 displays information associated with the second campaign. The second campaign is a campaign for "Company B" for a position identified as "Lead Generation." The prompt element 306 displays the prompt 212C from the second campaign data 136, and the media panel 310 displays a recorded video response of a candidate "Loren Lars," as identified in the candidate information 304.

Returning to FIG. 2, the evaluation campaign tool 110 may access the first campaign data 134 and the second campaign data 136 using the communication module 204. The prompt analyzer 112 may receive the prompts 210A-C and 212A-C and compare them to determine how similar or dissimilar the prompts are to each other. In some embodiments, the prompt analyzer 112 may compare each of the prompts to every other prompt, while in some other embodiments, the prompt analyzer 112 may compare each prompt from one campaign to all of the prompts of the other campaign. As shown in FIG. 3, the prompt 210A from the first campaign data 134 is "Tell us why you are interested in working for Company A." And as shown in FIG. 4, the prompt 212C from the second campaign data 136 is "Please tell us why you are interested in Company B." The data store 130 may include many recorded responses for each of these prompts and may also include ratings data and other evaluation data associated with the prompts. By combining the data available in the data store 130 that is associated with the prompt 210A with data available in the data store 130 that is associated with the prompt 212C, a larger, more robust data set may be produced.

The prompt analyzer 112 may determine whether the prompts 210A and 212C are sufficiently related to justify combination of associated data. In some embodiments, the prompt analyzer 112 determines or calculates the number of edits that would need to be made to prompt 210A to transform prompt 210A into prompt 212C. For ease of explanation, the prompts 210A and 212C are included again below:

Tell us why you are interested in working for Company A. (Prompt 210A)

Please tell us why you are interested in Company B. (Prompt 212C)

As shown above, to change prompt 210A into prompt 212C could be done by adding "Please" to the start of prompt 210A, removing "working for", and substituting Company B for Company A. Thus, three edits would be required to transform prompt 210A into prompt 212C. This number of edits may be referred to herein as a distance, which may be understood as the number of edits required to modify the first prompt to be identical to the second prompt. In this example, prompts 210A and prompt 212C have a distance of three. The distance may be a Levenshtein distance, in which each addition, subtraction, or substitution is counted to determine the degree of similarity or dissimilarity between two prompts. In some embodiments, the distance may be calculated at the word-level, such that the addition, subtraction, or substitution of a word is an edit. In other embodiments, character-level distances may be used. In such embodiments, the addition, subtraction, or substitution of a character may be counted as an edit. Modifications in the way the number of edits separating two prompts are counted are within the scope of this disclosure. In some embodiments, punctuation may be ignored when comparing two prompts, such that a modification of a period to a quotation mark is not counted in the determination of the similarity or distance. Additionally, the name of the company conducting the campaign may be excluded from the analysis. For example, if Company A were named "Big Co." and Company B were named "Little Co.", the substitution of "Little Co." for "Big Co." may not be counted by the prompt analyzer 112 in determining the degree of similarity or distance between prompts 210A and 212C.

To facilitate the determination of similarity between two prompts, the prompt analyzer 112 may communicate with one or more lookup tables available locally or available in the data store 130. Such look up tables may include a synonym look up table to enable the prompt analyzer 112 to identify synonyms present in two prompts being compared. If a word in a first prompt is included as a synonym of a word in a second prompt (as determined by the synonym look up table) the substitution may not be counted in determining the similarity or distance between the two prompts. In order to minimize the memory footprint of the synonym table, the synonym table may be represented as a sparse binary matrix in memory, in some embodiments. Each row and column may represent a unique word or tuple (e.g., a group of words). The string mapping may be stored in a separate mapping table.

In some embodiments, the substitution of a synonym may be regarded as a fraction of an edit. Similarly, the modification of one word to another word that shares the same root (e.g., "motivate" and "motivation" or "motivating") may not be counted as an edit or may be counted as a fraction of an edit. For example, the modification of "motivate" to "motivating" may be counted as half of an edit. In such instances, the common root may be identified as a matching set of consecutive characters "motivat." In some embodiments, words that share more than a threshold percentage of characters (e.g., 50%) may not be counted as an edit or may be counted as a fraction of an edit. In such embodiments, the common root may only be used if it includes more than a threshold number of characters, e.g. five characters. In some embodiments, a lookup table of related words is provided such that a lookup for "motivate" indicates that "motivating" is not a standard edit, but may not count or may have a fractional count. Additionally, punctuation may be discarded before determining the similarity of two prompts or may be ignored during the determination.

The above explanation describes the determination of the degree of similarity between two prompts. Such determinations may be applied to groups by performing the comparison between pairings of prompts of the group and counting the number of edits. In order to better compare the distance between pairings of prompts, the distances may be normalized. For example, the distance between a first pair of prompts may be normalized by an average character-length or word-length of the two prompts. A similarity matrix (also referred to as a distance matrix) may be produced having comparisons of each of the prompts of a first campaign with each of the prompts of the second campaign or comparisons of each of the prompts in a combined set of prompts with each of the other prompts in the combined set. To facilitate analysis of the distance matrix, each distance may be normalized by the largest distance.

FIGS. 5-8 illustrate a series of plots that may be generated in a process of identifying clusters of related prompts such that campaign data associated with those clusters may be combined to facilitate additional analysis and to improve prompt recommendations. The information displayed in FIGS. 5-8 may be generated by prompt analyzer 112 of the evaluation campaign tool 110 of FIGS. 1 and 2 to enable the prompt recommendation engine 114 to identify and recommend prompts that are the most predictive across an entire employment sector.

The following embodiments, with reference to FIGS. 5-8, describe operations to identify what data sets can be combined for analysis. For example, the plots illustrated in FIGS. 5-8 identify which questions can be clustered together and then analyzed for their decisiveness.

Figure 5:
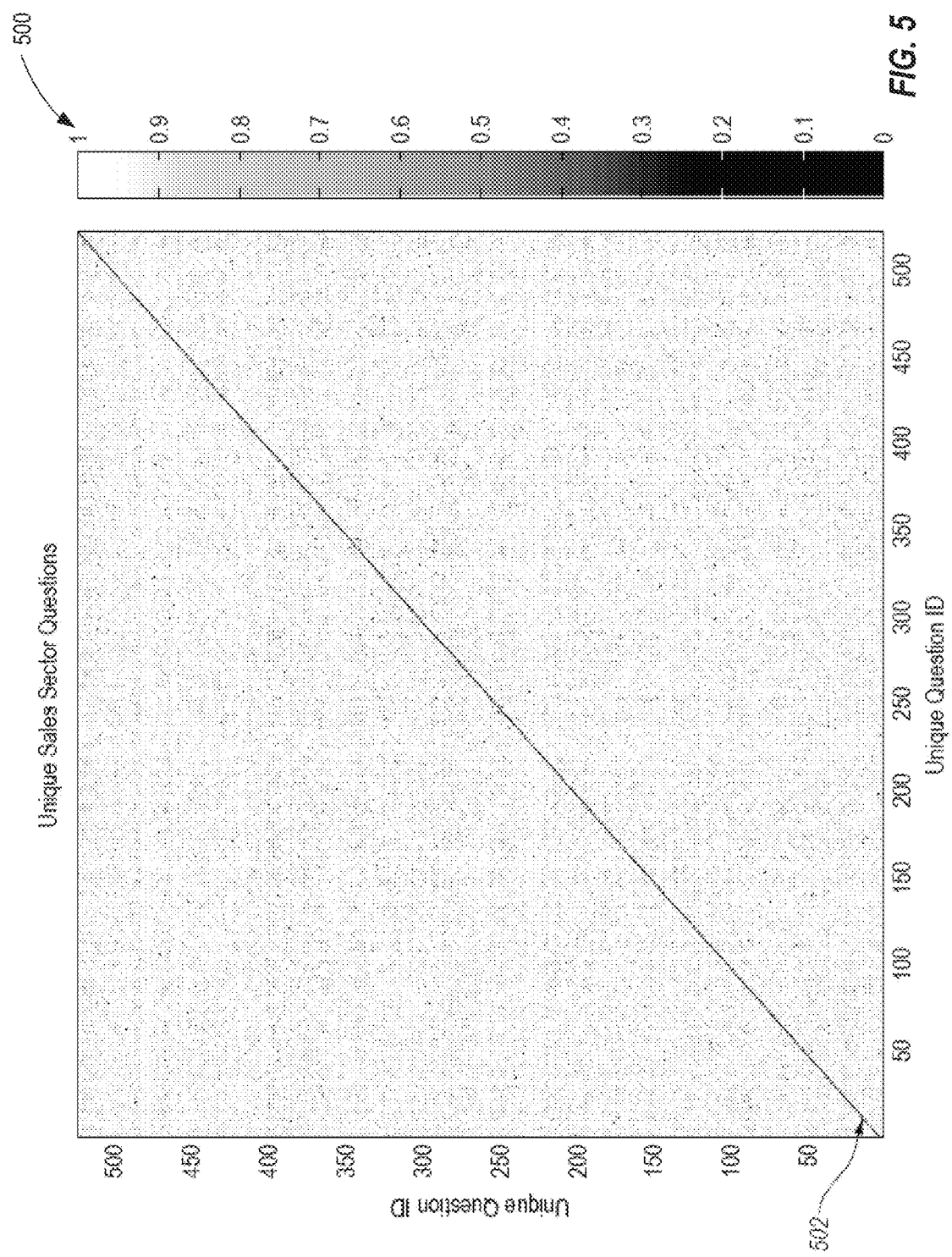
FIG. 5 is a plot of similarities of unique prompts in an unorganized arrangement according to one embodiment.

FIG. 5 is a plot 500 of similarities of a set of unique prompts in an unorganized arrangement according to one embodiment. The set is a combined set, such that it includes prompts from a first campaign and from a second campaign. As illustrated in FIG. 5, the plot 500 represents a normalized similarity matrix generated from the comparisons of over 500 unique prompts, such as may be performed by the prompt analyzer 112 of FIG. 2. As seen in FIG. 5, a diagonal line 502 identifies values in the matrix in which a prompt is compared to itself and so zero edits would be needed to modify to prompt. As shown in the plot a value of 0 indicates that the prompt pair is identical (e.g., a prompt is being compared to itself, therefore the distance between the "pair" is zero) and a value of 1 when the prompts have no words in common.

Figure 6:
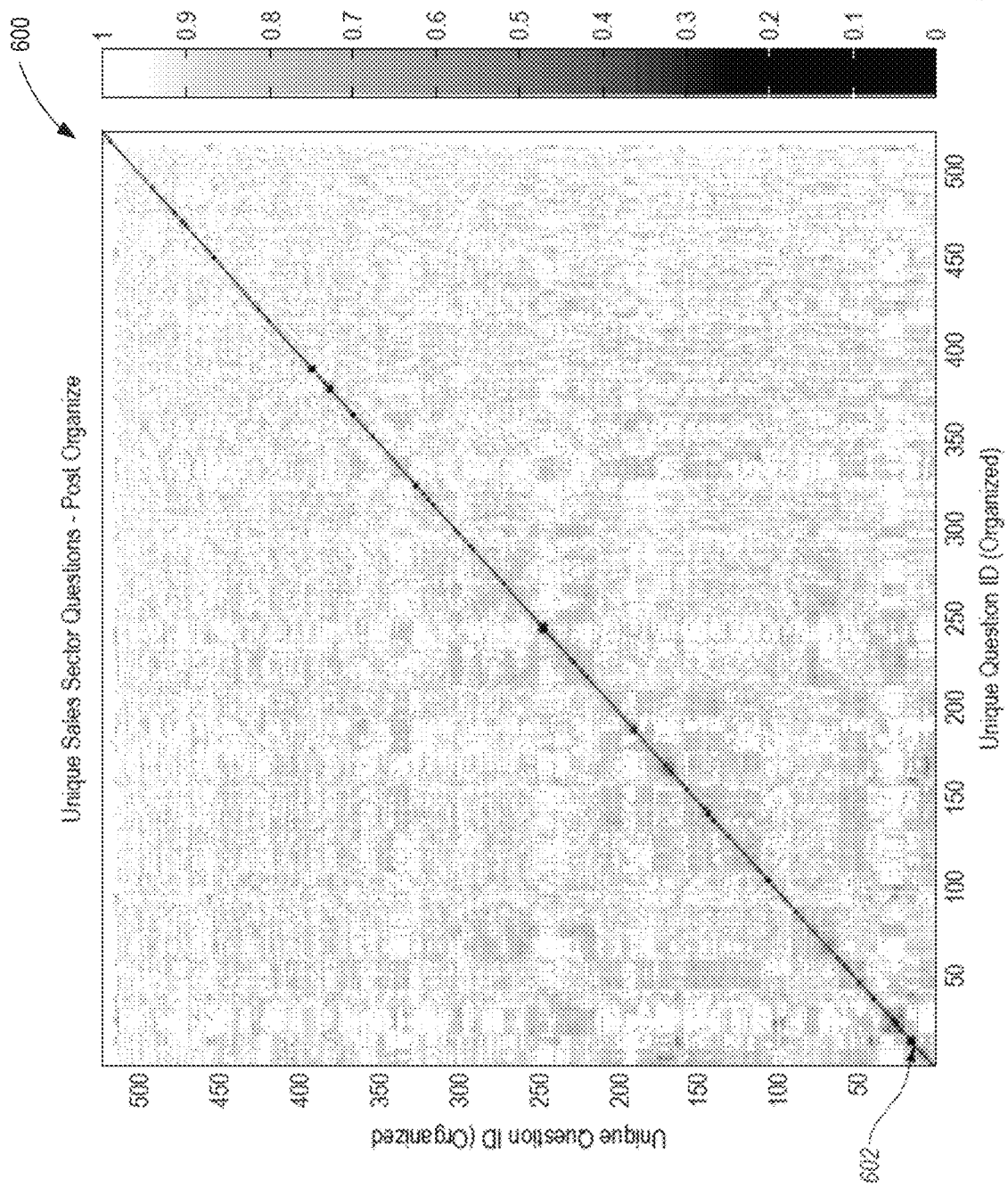
FIG. 6 is a plot of similarities of unique prompts in an ordered arrangement according to one embodiment.

FIG. 6 is a plot 600 of the similarities of the set of unique prompts shown in plot 500 after a clustering operation is performed. For example, the information seen in plot 500 may be passed through a self-organizing map (SOM) algorithm to maximize cluster size as shown in plot 600. The SOM algorithm may shuffle the rows and columns to produce clusters of similar data. The clusters shown in plot 600 may be used to identify related prompt clusters. For example, the following prompts may be found in a cluster:

What led you to apply for this position?
What attracted you to apply for this specific position?
What is the reason you applied for this opportunity?
Tell us why you applied for this position.

The distance matrix may indicate that these prompts are related by grouping the prompts together in a related prompt cluster having a local minimum in distances as seen in plot 600. Plot 600 includes an exemplary cluster 602 and other clusters. Because the similarity of these prompts may be determined to be high, it may be inferred that the prompts have similar meanings. Because this cluster of prompts has a similar meaning, the responses of candidates to any of these prompts may address the same issues. Accordingly, the data associated with these prompts, including ratings data, etc., may be combined for analysis. Even though each of the prompts may be from a separate evaluation campaign, the ratings data and evaluation result data may be combined in a combined data set for analysis of the prompts. Such analysis may include an analysis of the decisiveness of the prompt by using ratings and evaluation result data obtained during the evaluation process. Using achievement data obtained after the evaluation process, a relatedness of the rating of the response to on-the-job performance may be determined by the evaluation campaign tool 110. This relatedness may also be referred to by the "decisiveness" of a prompt. This may allow the campaign managers to assign a more appropriate weight to related prompts in future campaigns and to select the more decisive prompts.

Figure 7:
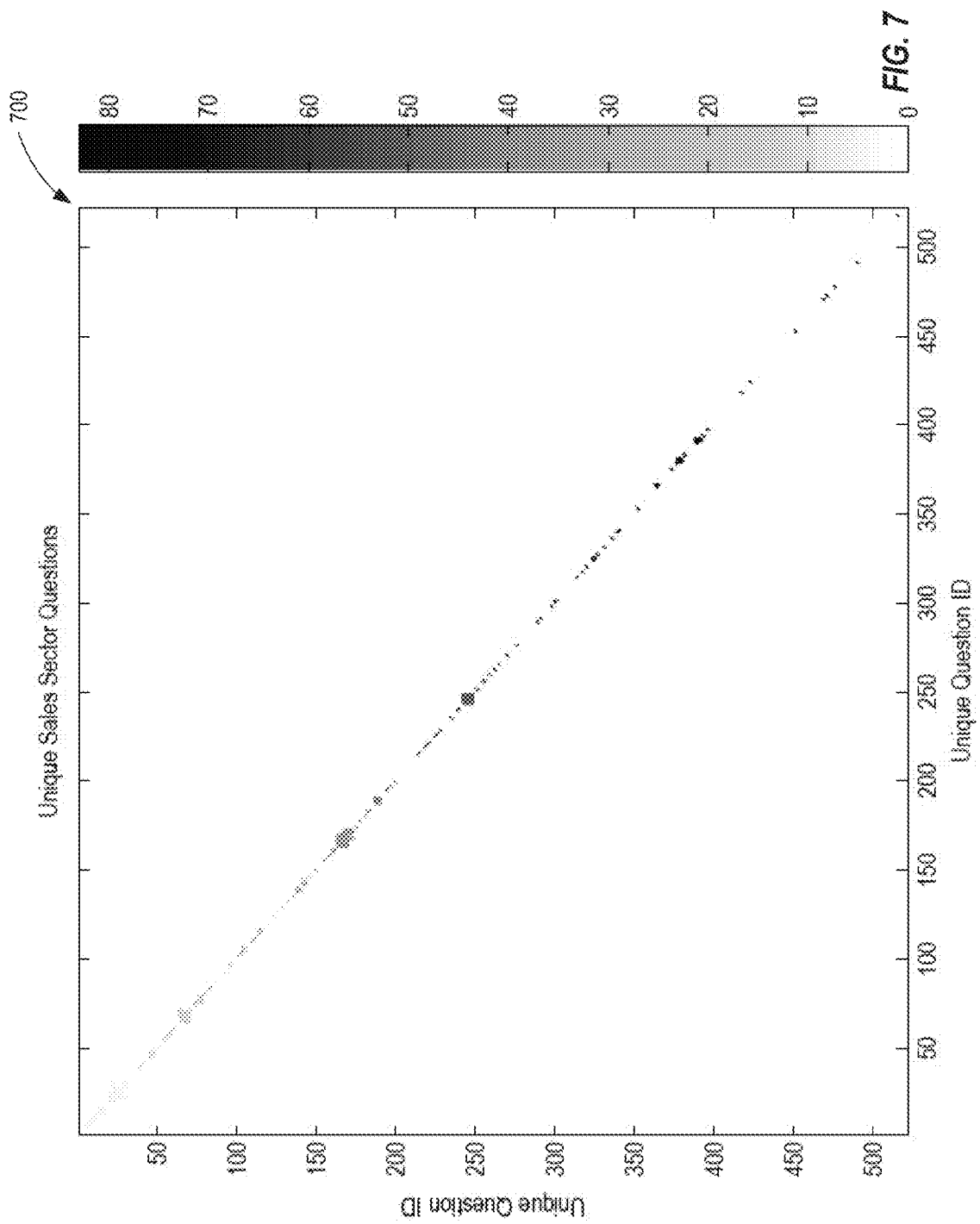
FIG. 7 is another plot of similarities of unique prompts in an ordered arrangement with a threshold according to one embodiment.

FIG. 7 is plot 700 of similarities of unique questions in an ordered arrangement with a threshold applied according to one embodiment. Thresholding methods may be applied to the data as presented in plot 600 to isolate clusters of related prompts. For example, all clusters with more than two campaigns may be used, or any clusters with average distance scores below a threshold, such as 60%, may be identified. In some embodiments, each cluster may be compared to determine which cluster has the strongest metrics. When the clusters are isolated, each cluster may be analyzed to determine relative properties of importance. Such properties may include decisiveness, predictive qualities, competency related qualities, etc. In plot 700, a threshold is applied to ignore pairings having a normalized distance of more than 60%, thereby plotting only the pairings that are more similar than the 60% threshold. Thereafter, a threshold cluster size may be applied to further identity the isolated clusters or related prompts.

Figure 8:
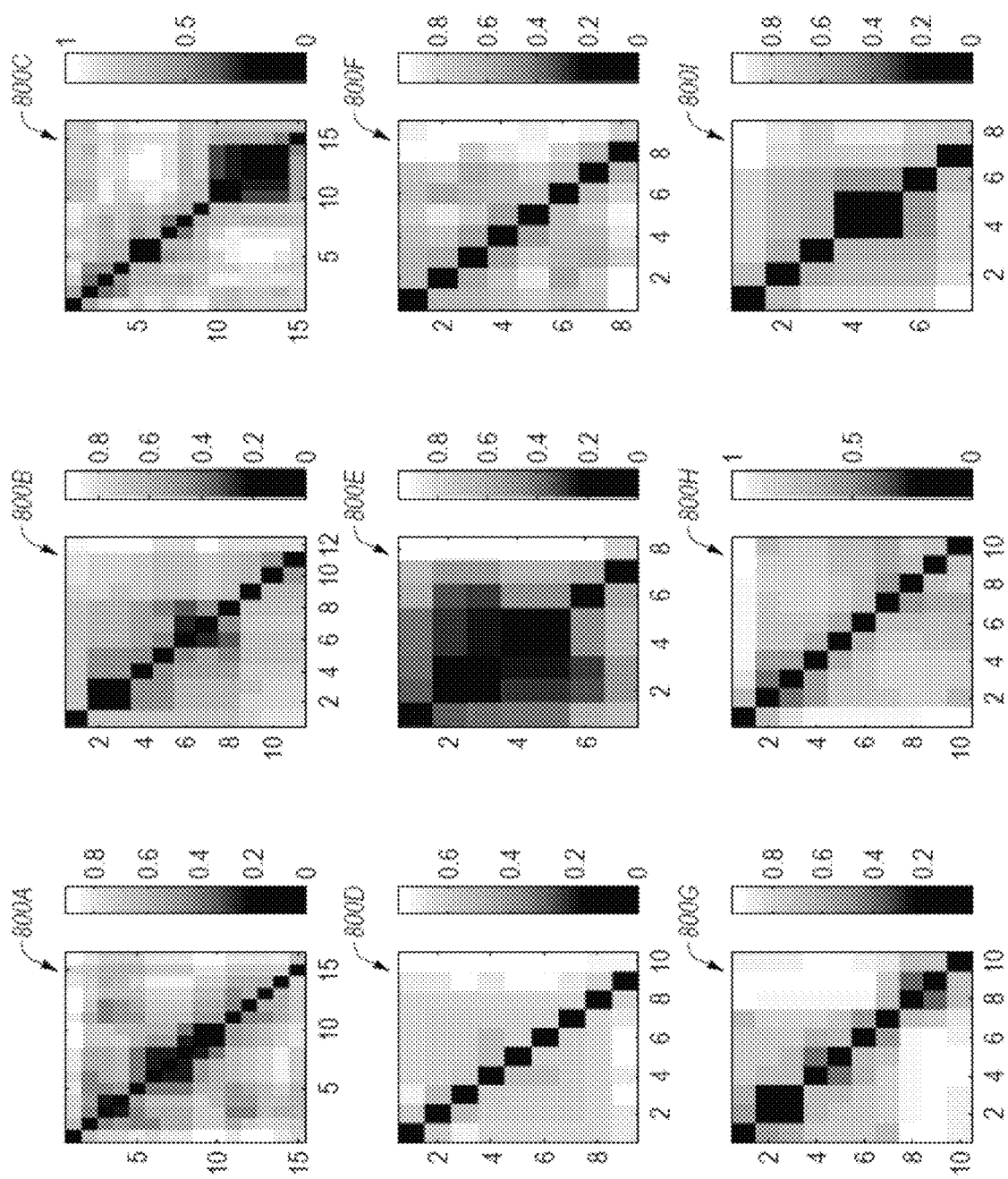
FIG. 8 illustrates several clusters of prompts identified on a plot of similarities according to one embodiment.

FIG. 8 illustrates exemplary clusters 800A, 800B, 800C, 800D, 800E, 800F, 800G, 800H, and 800I identified on a plot of similarities according to one embodiment. The clusters 800A-I are of varying sizes, indicating that each cluster may include a different number of related prompts.

Figure 9:
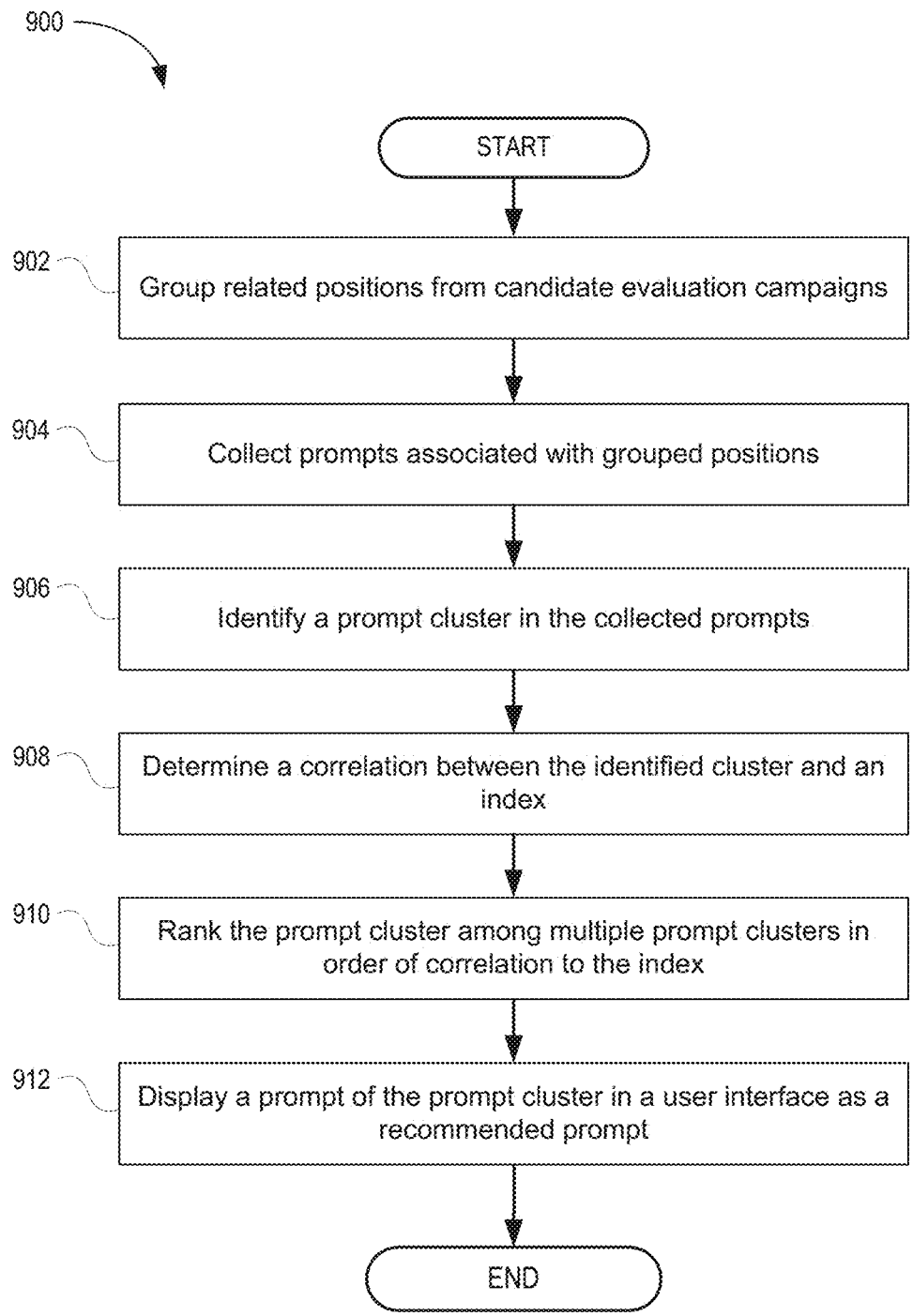
FIG. 9 is a flow chart of a method of ranking clusters of prompts according to an embodiment.

FIG. 9 is a flow diagram illustrating a method 900 of identifying and ranking clusters of prompts in a digital evaluation platform, like the digital evaluation platform 101 of FIG. 1. Embodiments of the method 900 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 900 and other methods of this disclosure may be depicted and described as a series of acts or operations. However, operations in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on a non-transitory, tangible, computer-readable medium to facilitate transporting and transferring such methods to computing devices.

Embodiments of the method 900 may begin at block 902, at which the processing logic groups related positions from multiple candidate evaluation campaigns. For example, the processing logic may determine from position titles and/or position descriptions in first campaign data 134 and second campaign data 136 that the positions intended to be filled by the first and second campaigns are related. For example, campaigns for "sales" and "lead generation" may be grouped together based on those position titles or based on the descriptions of the positions. In this way, the positions may be determined to be in a position sector. The position sector may be one of a sales sector, an engineering sector, an accounting sector, a legal sector, or another position or employment sector.

At block 904, the processing logic collects prompts associated with the grouped positions. For example, the evaluation campaign tool 110 may collect the prompts 210A-C and the prompts 212A-C into a combined set of prompts. In some embodiments, prompts may be collected from more than two evaluation campaigns after the more the two evaluation campaigns are determined to be in a shared position sector and then grouped. At block 906, the processing logic identifies a prompt cluster in the collected prompts. As illustrated in FIGS. 5-8 and described above and elsewhere herein, the combined set of prompts may be collected and then analyzed from the prompt analyzer 112 to identify one or more clusters of related prompts. A correlation between the identified cluster may be determined by the processing logic at block 908.

For example, a statistical relationship between ratings of reviewed recorded responses of candidates for prompts that form the prompt cluster and the evaluation results of the candidates may be identified. In some embodiments, the performance of candidates on an achievement index may be correlated to the responses of those candidates to prompts and the identified cluster of prompts. At block 910, the processing logic links the identified prompt cluster among multiple prompt clusters in order of correlation to the index. In this manner, the correlation of a prompt with evaluation results (or with on-the-job performance) may be determined. By identifying the more salient prompt clusters, new evaluation campaigns may be created that are more effective and lead to improved evaluation decisions. In some embodiments, the importance or decisiveness of individual prompts may be determined first. Afterwards, this decisiveness data may be used to determine an average decisiveness of the identified cluster by performing a mathematical average of each of the prompts included in the identified cluster.

At block 912, after identifying the more decisive prompts, when a campaign manager uses the digital evaluation platform 101 to create a new campaign, the prompt recommendation engine 114 of the evaluation campaign tool 110 (as seen in FIGS. 1 and 2) may display one or more recommended prompts, as a recommended prompt, in a user interface provided by the GUI engine 206 for the creation of evaluation campaigns.

Figure 10:
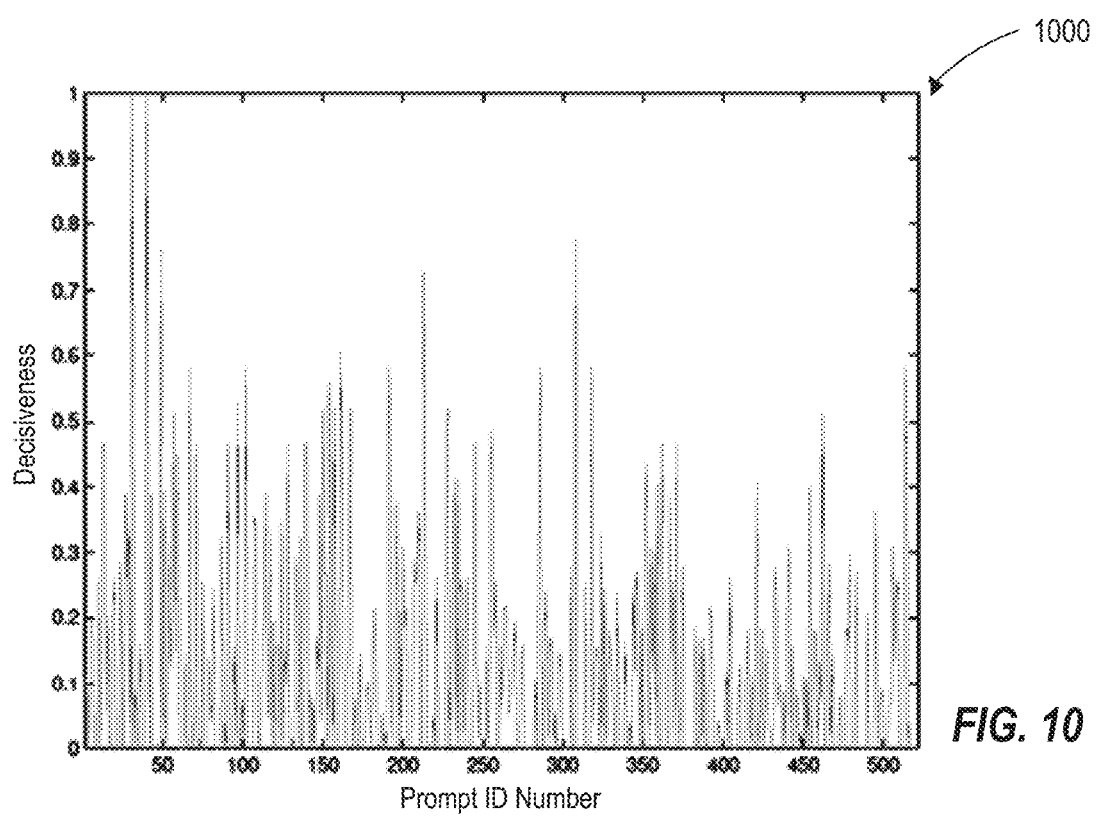
FIG. 10 is a plot of the decisiveness of each of a combined set of prompts according to an embodiment.

FIG. 10 is a plot 1000 illustrating the decisiveness rating of a combined set of prompts obtained from multiple evaluation campaigns. As shown in plot 1000, the decisiveness rating or ranking is normalized for each of multiple prompts, arranged by prompt identifier number, such that the most decisive prompt has a decisiveness value equal to one. The data set illustrated and plot 1000 may be used to calculate a decisiveness value for the prompt cluster after the prompt cluster has been identified. In some embodiments, the prompt recommendation engine 114 may use the information illustrated in plot 1000 to identify one or more of the most decisive prompts for recommendation and display to a campaign manager using the digital evaluation platform 101. For example, the prompt recommendation engine 114 may recommend the four prompts (or another number of prompts) having the highest decisiveness value. The creation of plot 1000 is described in further detail below.

It should be noted that plot 1000 shows the distribution of how decisiveness varies between the various questions/prompts. In various embodiments, UIs can be used to recommend different questions based on the processed data. For example, the prompt recommendation engine 114 could sort prompts by their decisiveness and show a list of most useful prompts to a campaign manager to select appropriate prompts for a campaign. Alternatively, the data set can be used by a campaign manager to select prompts in other manners as would be appreciated by one having the benefit of this disclosure.

Figure 11:
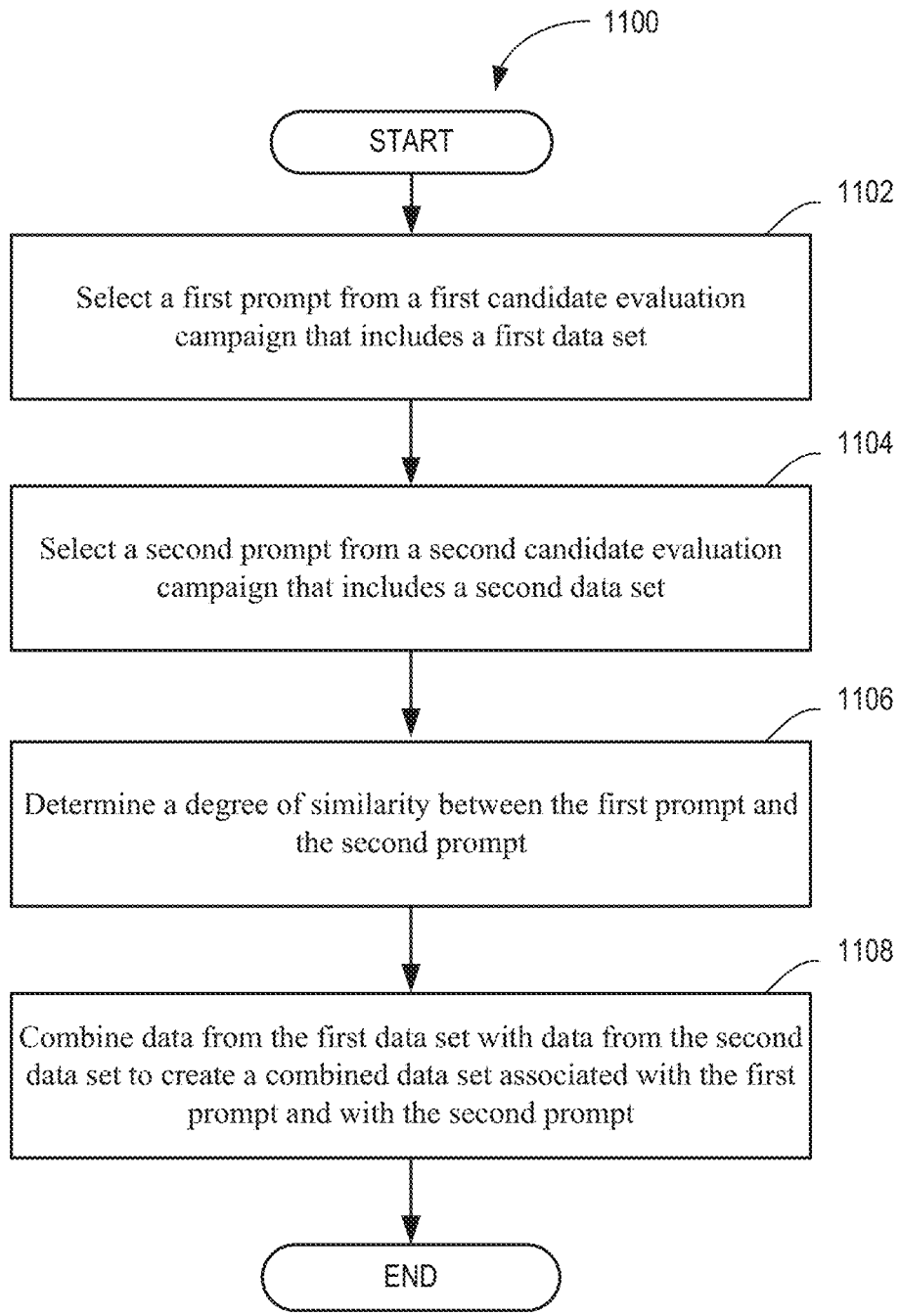
FIG. 11 is a flow chart of a method of aggregating evaluation data according to one embodiment.

FIG. 11 is a flow chart of a method 1100 of aggregating evaluation data in a digital evaluation platform, like the digital evaluation platform 101 of FIG. 1, according to one embodiment. The method 1100 may be performed by processing logic such as described above in connection with method 900 of FIG. 9. Embodiments of the method 1100 may begin at block 1102 in which the processing logic selects a first prompt from a first candidate evaluation campaign. The first candidate evaluation campaign includes a first data set. The first data set includes the first prompt and may include additional prompts, ratings data, evaluation result data, achievement data, presentation settings, etc. At block 1104, the processing logic selects a second prompt from a second candidate evaluation campaign. The first and second prompts are accessible in a database of a candidate evaluation system (like the digital evaluation platform 101 of FIG. 1) being executed by a processing device. Like the first candidate evaluation campaign, the second candidate evaluation campaign includes a second data set.

At block 1106, the processing logic determines a degree of similarity between the first prompt and the second prompt. This may be determined by the prompt analyzer 112 of the evaluation campaign tool 110, as seen in FIGS. 1 and 2 and as described herein. The processing logic may calculate a number of edits or changes needed to transform the first prompt into the second prompt, and/or a number of edits needed to transform the second prompt into the first prompt. This number of edits is also referred to as a distance and may be a Levenshtein distance with the modifications and variations described herein.

At block 1108, the processing logic may combine data from the first data set with data from the second data set to create a combined data set associated with both the first prompt and with the second prompt. The combined data may include ratings data, evaluation result data, achievement data, and other data associated with both the prompts. The combined data set further includes both the first and second prompts and may include additional prompts associated with the first and second candidate evaluation campaigns. By combining the first data set with the second data set, a larger, more robust combined data may be formed. The reliability of statistically-derived information obtained from the combined data set may be greater than that for either of the first data set and the second data set individually. For example, the decisiveness of a related cluster of prompts may be determined with more accuracy. For convenience, the decisiveness value for the cluster may be considered valid for each of the prompts in the cluster. Alternatively, further analysis may determine a most decisive prompt of an identified cluster.

In some embodiments of the method 1100, the processing logic compares the determined degree of similarity with a threshold degree of similarity and combines the data from the first data set with data from the second data set to create the combined data set if the determined degree of similarity is greater than the threshold degree of similarity. Additionally, the processing logic may determine that the first candidate evaluation campaign and the second candidate evaluation campaign are for positions in the same position sector. This may be done because the prompts used in for a campaign in one position sector, such as sales, may be significantly different from the prompts used for a campaign in another position sector, such as engineering. When the positions are significantly different, combining data from the unrelated campaigns may not provide the same benefits as combining data from related campaigns. The position sector may be one of a sales sector, an engineering sector, an accounting sector, a legal sector, or another position or employment sector.

In some embodiments of the method 1100, the processing logic also adds at least one of the first prompt or the second prompt to a prompt cluster that includes related prompts, as determined by their degree of similarity. The processing logic may then identify one of the prompts as a template prompt and recommend the template prompt to an evaluation designer for a new candidate evaluation campaign.

As an example, the following prompts are present in an identified cluster of related prompts.

1. Tell us why you are interested in work for ********.
2. Why are you interested in working for ********?
3. So why are you interested in our company?
4. Please tell us why you are interested in ********.
5. Why do you want to work for ********?

As shown above, "******" represents a variable inserted into the prompts in place of a company name, or other identifying information, by the evaluation campaign tool 110 to facilitate analysis and/or template creation. The evaluation campaign tool 110, or the processing logic of the method 1100**, may calculate the distances between each of these prompts to each of the other prompts in the cluster. The prompt having the smallest average distance to the other prompts may be selected as the template prompt. The template prompt may then be recommended to a campaign manager when creating a new candidate evaluation campaign.

In some embodiments, the selection of the template prompt may be performed by the processing logic by identifying the words that are the most predictive to a desired objective. The words of a prompt may be individually weighted by using a training algorithm, such as may be provided by the system identification module 202 of FIG. 2. For example, a naïve Bayes or any other system identification algorithm may be used by the system identification module 202 to map a word weight to an outcome. This may allow the campaign manager to build template prompts with optimal wording to more effectively differentiate between candidates based on a desired metric, such as an achievement index. Exemplary word-weightings are included as seen below.

1. $\underset{0.4}{\text{Tell}}\ \underset{0.4}{\text{us}}\ \underset{1.0}{\text{why}}\ \underset{1.0}{\text{you}}\ \underset{0.8}{\text{are}}\ \underset{0.8}{\text{interested}}\ \underset{0.8}{\text{in}}\ \underset{0.4}{\text{working}}\ \underset{0.6}{\text{for}}$ ********.

2. $\underset{1.0}{\text{Why}}\ \underset{0.8}{\text{are}}\ \underset{1.0}{\text{you}}\ \underset{0.8}{\text{interested}}\ \underset{0.8}{\text{in}}\ \underset{0.4}{\text{working}}\ \underset{0.8}{\text{for}}$ ********.

3. $\underset{0.2}{\text{So}}\ \underset{1.0}{\text{why}}\ \underset{0.8}{\text{are}}\ \underset{1.0}{\text{you}}\ \underset{0.8}{\text{interested}}\ \underset{0.8}{\text{in}}\ \underset{0.2}{\text{our}}\ \underset{0.2}{\text{company}}.$ -continued 4. $\overset{0.2}{\text{Please}}\ \overset{0.4}{\text{tell}}\ \overset{0.4}{\text{us}}\ \overset{1.0}{\text{why}}\ \overset{1.0}{\text{you}}\ \overset{0.8}{\text{are}}\ \overset{0.8}{\text{interested}}\ \overset{0.8}{\text{in}}\ \text{******}.$ 5. $\overset{1.0}{\text{Why}}\ \overset{0.2}{\text{do}}\ \overset{1.0}{\text{you}}\ \overset{0.2}{\text{want}}\ \overset{0.2}{\text{to}}\ \overset{0.2}{\text{work}}\ \overset{0.6}{\text{for}}\ \text{****}.$ In the example shown above, the word weights are provided by the frequency of each word in a specific set of prompts or in a database including all of the prompts used by a digital evaluation platform. To compare the prompts, the word weights of a prompt are summed and the sum is then averaged by the number of words in the prompt. This may discourage long prompts. The prompt with the highest mean word weight is prompt 2, with a mean score of 0.8814 per word. The prompt with the lowest mean word weight is prompt 5, which has a mean score of 0.4857 per word. Different methods may be used to provide more complex word weight estimates using outcome data and/or a training algorithm, such as naïve Bayes. For example, rather than using the frequency of each word in the set of prompts, the frequency of each word in a narrowed subset of prompts may be used, such as a subset of prompts that is determined to be more effective in evaluating candidates than another subset of prompts. In this way, a most decisive prompt in an identified prompt cluster may be determined. This prompt may be provided by the prompt recommendation engine 114 to a campaign manager during the creation of an evaluation campaign in the associated sector using the digital evaluation platform 101**.

Figure 12:
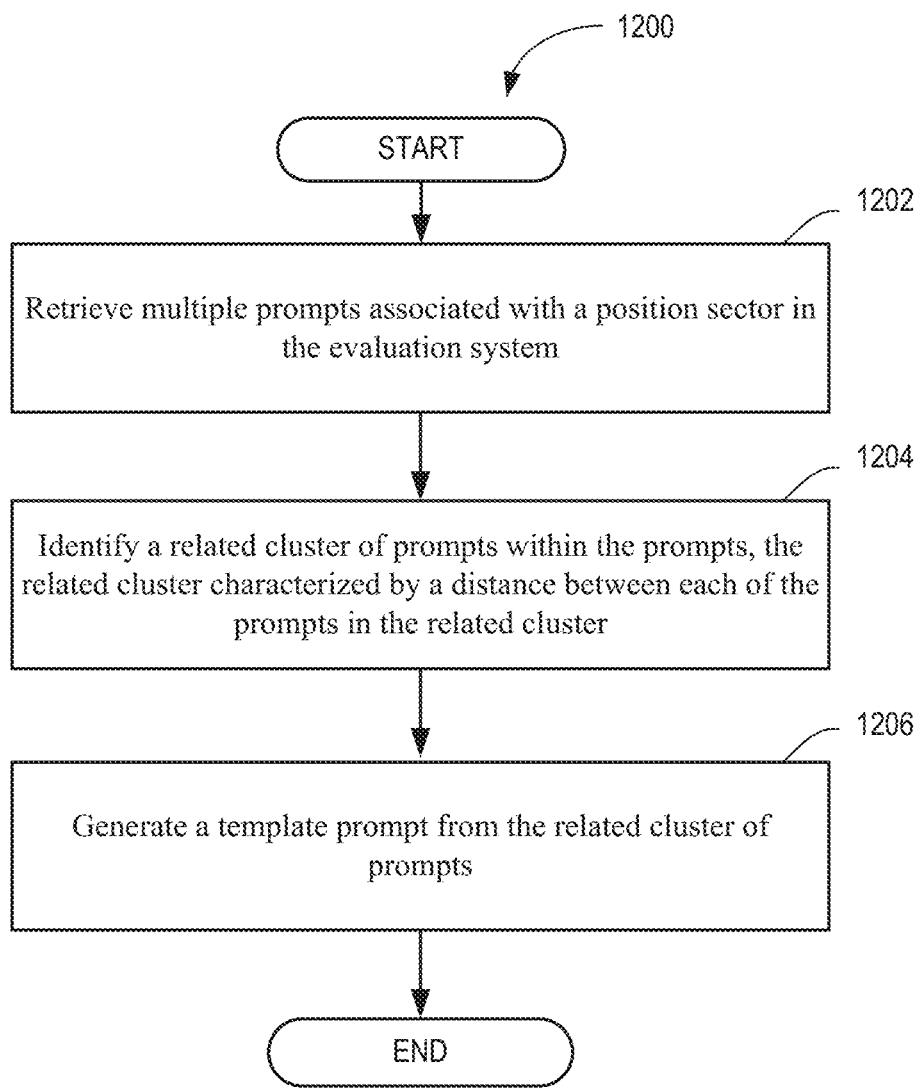
FIG. 12 is a flow chart of a method of generating template prompts according to an embodiment.

FIG. 12 is a flow chart of a method 1200 of generating template prompts according to an embodiment. The method 1200 may be performed by processing logic as described herein, such as that described above in connection with FIGS. 9 and 11. Embodiments of the method 1200 may begin at block 1202, at which the processing logic retrieves prompts associated with a position sector in an evaluation system. For example, the evaluation campaign tool 110 of FIGS. 1 and 2 may determine that the first campaign data 134 and the second campaign data 136, stored in data store 130, are in related position sectors or in the same position sector. This may be done by analyzing the names of the positions for which each campaign was created. In some embodiments, descriptions of the positions may also be used in identifying related employment sectors. The evaluation campaign tool 110 may gather prompts from the first campaign data 134, the second campaign data 136, and/or other campaign data (if determined to be in or related to the position sector) stored in the data store 130, in additional to ratings data and evaluation result data. In some embodiments, additional data may be included from a set of achievement data.

At block 1204, the processing logic identifies a related cluster of prompts within the gathered prompts. The related cluster may be characterized by a degree of similarity or a distance between each of the prompts in the related cluster. For example, the distance between each of the prompts in the related cluster may be lower than a threshold distance. This may be done as described herein in connection with FIGS. 5-8 and in connection with the method 900 of FIG. 9 and in other portions of the disclosure.

At block 1206, the processing logic generates a template prompt from the related cluster of prompts. In some embodiments, the template prompt may include one or more variables that allow for customization of the template prompt by a campaign manager. For example, the campaign manager may select a name of the sponsoring organization for use in place of a variable in the generated template prompt. The prompt recommendation engine 114 of the evaluation campaign tool 110 may generate the template prompt by determining a most similar prompt among the related cluster of prompts. The most similar prompt may be the prompt with the lowest average distance to all of the other prompts in the related cluster.

In some embodiments, the prompt recommendation engine 114 may assign weights to each of the words in each of the prompts and select the prompt having the highest average word weight by summing the weights and dividing by the number of words in the prompt. The weight of a word may also be determined by using a training algorithm, such a naïve Bayes algorithm, to map the weight of a word to an evaluation rating, an evaluation outcome or result, or an achievement index. The template prompt may be the prompt having the highest average word decisiveness. In some embodiments, the decisiveness or relatedness of a prompt to an achievement index may be determined at the level of the prompt. The prompt (taken as a whole, rather than word by word) that is the most decisive of the related cluster may be used as the template prompt and provided to a campaign manager during the formation of a new evaluation campaign.

The template prompt is provided to campaign managers in forming new evaluation campaigns to assist in including useful prompts. The importance or usefulness of a particular prompt may depend on the position sector. Generally, if the prompt is decisive in determining which candidates are selected in an evaluation campaign and in selecting high quality candidates as determined by subsequent performance on the job or in the program, then the prompt may be provided as a template prompt for recommendation to campaign managers.

In order to determine a relationship or correlation between a prompt and the performance of candidates after being selected, a historical data set must be gathered over time. The historical data set may include information from performance evaluations and/or other metrics and may be used to create an achievement index. The achievement index may include job performance, such as sales targets or other performance targets, credentialing examination performance, work advancement rates, task efficiency, realization, etc. Some example of credentialing examination performance may include whether a candidate passed or failed a credentialing exam, such as a bar exam, a stockbroker exam, CPA exam, boards, etc. Many other factors may be used in creating an achievement index. The likelihood of a separation of termination of a selected candidate may be included as well as subsequent academic performance. For example, a grade point average (GPA) may be used in generating an achievement index value for a selected candidate. Academic test scores may be included as well and added into the historical data set after being received by the selected candidate. Some exemplary test scores may include scores for the MCAT, PCAT, DAT, GMAT, LSAT, GRE, etc. An estimation of the likelihood of finishing an academic program may be a factor in an achievement index.

In some embodiments, the amount of grant money received by a selected candidate and/or a number of grants received may be included in achievement data used to create an achieve index. Similarly, papers or other academic, scientific, or professional writings and/or presentations may be included in the creation of an achievement index. In some embodiments, a cumulative citation factor may be provided. For example, a citation factor may be determined on the quality or reputation of the publication in which the paper or writing issues or on the forum in which a presentation is made. The sum of citation factors may indicate high performance and/or professional involvement of the selected candidate.

In general, any performance metric that may be used to assess a selected candidate in work performance or in performance in an academic program, etc., may be used in assessing the decisiveness and/or predictiveness of prompts used in the evaluation campaign in which the candidate was selected. This information may be provided as achievement data in a database and made accessible to the evaluation campaign tool 110 of the digital evaluation platform 101 of FIG. 1. In some embodiments, such as where the digital evaluation platform 101 is a component or a service of a human resources management system, this achievement data may be stored in the data store 130 by default. In some embodiments, the achievement data may be stored as raw data, while in other embodiments, the achievement index may be calculated and then stored in the data store 130.

By using the post-decision historical data to form an achievement index and using the historical data, including ratings and evaluation results, from multiple evaluation campaigns, template prompts may be selected that allow for the more efficient assessment of candidates and for improved quality in the selection process. By aggregating data from multiple campaigns, data from a large number of evaluations may be combined. For example, the combined historical data may include data from thousands of candidates to hundreds of thousands of candidates.

Through the application of position sector clustering and natural language processing techniques, many prompts may be collected from multiple sparse data sets to identify related prompt clusters. These prompt clusters may be assessed to identify a most useful prompt among the clusters. One of the prompts may be selected to provide a template prompt or a composite of the prompts may be used to provide the template prompt. The template prompt may then be provided to a campaign manager when creating a new evaluation campaign within the position cluster.

Many different methods may be used to determine the decisiveness of a given prompt or of a cluster of prompts. In some embodiments, a general predictive model for determining the decisiveness of a prompt may be expressed by Equation (1) as seen below:

$$y = F(r) \quad (1)$$

In Equation (1), F may represent a function (e.g., a linear function, a non-linear function, a custom algorithm, etc.), y is an evaluation result for a candidate, and r is a vector of ratings assigned by one or more review, r having a length ranging from 1 to n, where n is the total number of prompts in the evaluation. The function F may handle a dynamic vector length, so that an evaluation result prediction may be calculated as additional ratings are entered by an evaluator. Given a sufficient quantity of y and r data, the function F may be modelled to enable the prediction of a y from a given r. The predictive model may be provided by the evaluation campaign tool 110 or by other components of the digital evaluation platform 101.

The normalized value of the score or rating may be reported between 0 and 1, after normalization as seen in Equation (2) below:

$$rating_n = rating/gradingScale \quad (2),$$

where the gradingScale represents the maximum available score. For example, where a scoring or rating scale of 1-5 is used, the gradingScale would be 5. If a candidate receives a rating of 3 on a gradingScale of 5, the normalized rating would be 0.6

To determine the decisiveness of a question a ratings matrix R may be assembled, wherein each row of the matrix include the ratings vector r from the evaluation of a candidate. For example, such a ratings matrix R may be as shown below in Equation (3):

$$R = \begin{bmatrix} 0.2 & 0.4 & \ldots & 0.6 \\ 0.9 & 0.6 & \ldots & 1.0 \\ \vdots & \vdots & \ddots & \vdots \\ 0.1 & 0.5 & \ldots & 0.3 \end{bmatrix} \quad (3)$$

Each column of R may correspond to a different prompt used within a position sector being analyzed. Where a given prompt being analyzed was not used in a particular evaluation campaign, a row corresponding to a candidate evaluated in that particular campaign may use a value of zero as the rating for that given prompt in the ratings vector r. The ratings matrix R may be a sparse matrix.

To determine a measure of decisiveness the ratings matrix R may be split into two portions, one with high ratings and another with low ratings. A threshold may be used to sort the ratings from R into the two matrices. For example, ratings below a threshold of 0.5 may be placed into the low matrix, while ratings equal to or greater than 0.5 may be placed into a high matrix as shown below. Additionally, a value of 1 may be subtracted from the non-zero ratings in the low ratings matrix as show below, to create a positive ratings matrix component $R_{pos}$ and a negative ratings matrix component $R_{neg}$.

$$R_{split} = \quad (4)$$

$$R_{neg} | R_{pos} = \begin{bmatrix} 0.2-1 & 0.4-1 & \ldots & 0 & | & 0 & 0 & \ldots & 0.9 \\ 0 & 0 & \ldots & 0 & | & 0.9 & 0.6 & \ldots & 1.0 \\ \vdots & \vdots & \ddots & \vdots & | & \vdots & \vdots & \ddots & \vdots \\ 0.1-1 & 0.5-1 & \ldots & 0.3-1 & | & 0 & 0.5 & \ldots & 0 \end{bmatrix},$$

which may simplify to:

$$R_{split} = \begin{bmatrix} -0.8 & -0.6 & \ldots & 0 & | & 0 & 0 & \ldots & 0.9 \\ 0 & 0 & \ldots & 0 & | & 0.9 & 0.6 & \ldots & 1.0 \\ \vdots & \vdots & \ddots & \vdots & | & \vdots & \vdots & \ddots & \vdots \\ -0.9 & -0.5 & \ldots & -0.7 & | & 0 & 0.5 & \ldots & 0 \end{bmatrix} \quad (5)$$

Once the split ratings matrix $R_{split}$ is formulated as shown in Equation (5), then a system identification algorithm may be applied, such as support vector machines, decision-trees, symbolic regressions using genetic programming, neural networks, or others. For example, a non-negative least squares constrained algorithm may be used to produce a vector of corresponding weights β, where each question has a weight for negative scoring and positive scoring.

To further illustrate the use of the ratings matrix $R_{split}$, an exemplary evaluation result matrix may be provided. In this evaluation result matrix, a single metric is used: the evaluation decision of candidates. For example, candidates in an evaluation campaign may receive categorical decision results of "yes," "no," and "may be," which may be mapped to numerical representations as shown below in Equation (6):

$$Y = \begin{bmatrix} y_1 \\ y_2 \\ \vdots \\ y_n \end{bmatrix} = \begin{bmatrix} \text{yes} \\ \text{no} \\ \vdots \\ \text{maybe} \end{bmatrix} = \begin{bmatrix} 3 \\ 1 \\ \vdots \\ 2 \end{bmatrix} \qquad (6)$$

In other embodiments, other metrics may be used in place of the evaluation result matrix, including multiple metrics. For example, an achievement index may be used. Additionally, the numerical mapping may be a different mapping that provides a different weighting between results or other metrics. Using the $R_{split}$ and Y data sets, a predictive model may be constructed to predict the evaluation result, y, given an input ratings matrix R. Many different types of predictive model options may be used to predict question influence or decisiveness, including regression, neural networks, support vector machines, decision trains, Markov model variants, and others.

As an example, a constrained positive least squares system identification may be used to obtain a model according to Equation (7) as shown below:

$$\beta = \text{lsqnonneg}(R, Y) \qquad (7),$$

where β is defined by solving the linear system, a least squares non-negative algorithm in this case, for the smallest residual where all values of β remain positive. When β is solved for, the negative scoring β values can be combined with the positive scoring β values to determine prompt decisiveness. Several decisiveness metrics may be available from these β values. For example, decisiveness may be defined as shown below in Equation (8).

$$\text{Decisiveness} = \frac{\beta(1:n)}{\text{No}} + \frac{\beta(n+1:\text{end})}{\text{Yes}} = \frac{\beta(1:n)}{1} + \frac{\beta(n+1:\text{end})}{3} \qquad (8)$$

In Equation (8), β(1:n) represents all of the coefficients of the negative ratings, and β(n+1:end) represents all of the coefficients for positive ratings. The values in each β are shown as normalized by the decision result with which they are associated. The negative values of β are normalized by 1, because "no" was mapped to 1, while the positive values of ft are normalized by 3, since "yes" is mapped to 3. Exemplary results of this process of assessing the decisiveness of a prompt are presented herein in plot 1000 of FIG. 10, described above.

Figure 13:
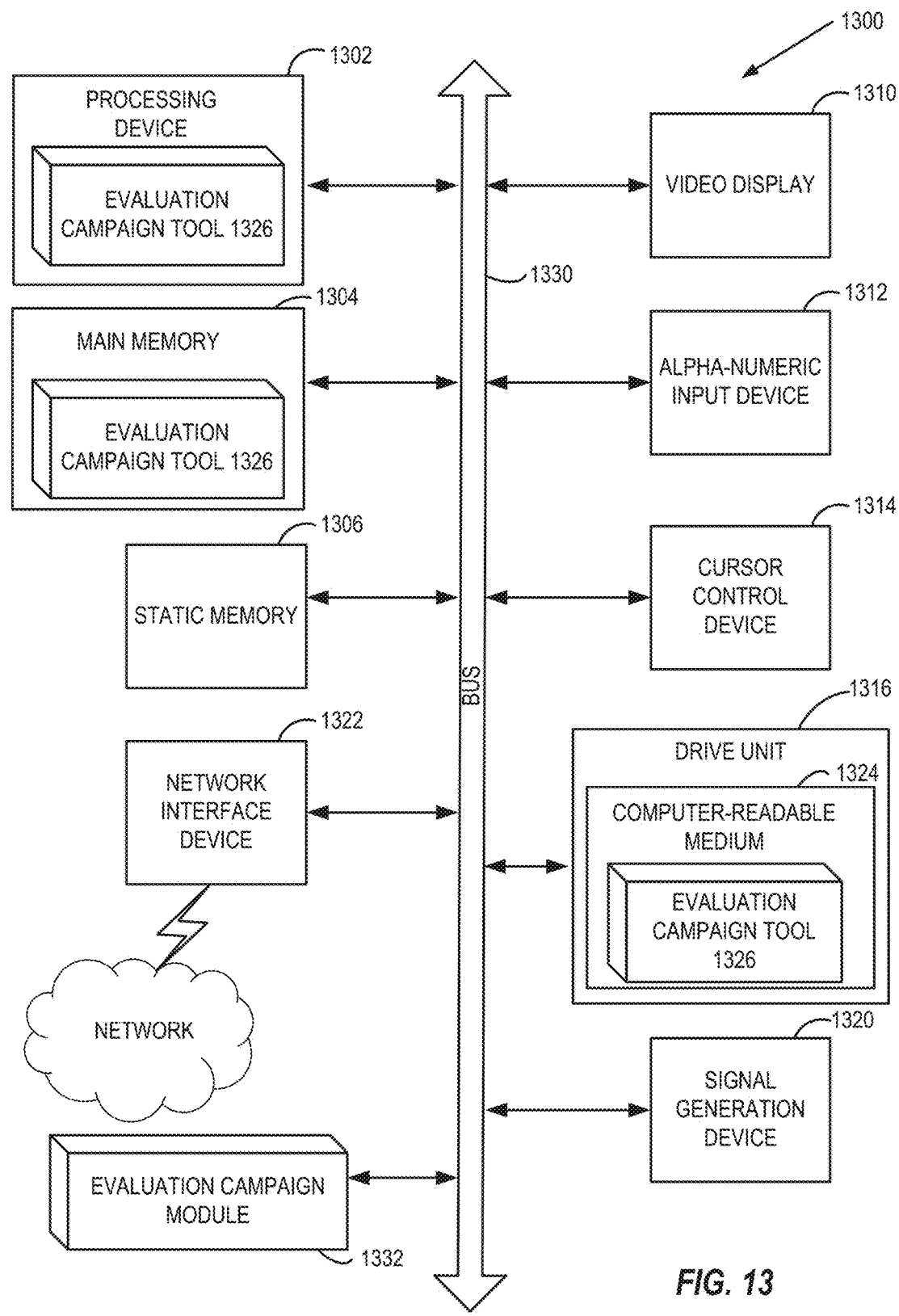
FIG. 13 is a diagrammatic representation of a machine in the exemplary form of a computing system for campaign evaluations according to an embodiment.

FIG. 13 illustrates a diagrammatic representation of a machine in the exemplary form of a computing system for campaign evaluations according to an embodiment. Within the computing system 1300 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for evaluation-assessment, including evaluation result prediction, the identification of prompt clusters, and the generation of template prompts, for performing and evaluating digital interviews and other assessment or evaluations, such as the methods 900, 1100, and 1200 of FIGS. 9, 11, and 12, respectively, as described herein. In one embodiment, the computing system 1300 represents various components that may be implemented in the server computing system 104 as described above. Alternatively, the server computing system 104 may include more or less components as illustrated in the computing system 1300. The computing system 1300 may provide the user interface 300 as seen in FIGS. 3 and 4.

The exemplary computing system 1300 includes a processing device 1302, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a data storage device 1316, each of which communicate with each other via a bus 1330.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1302 is configured to execute the processing logic (e.g., evaluation campaign tool 1326) for performing the operations and steps discussed herein.

The computing system 1300 may further include a network interface device 1322. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The data storage device 1316 may include a computer-readable storage medium 1324 on which is stored one or more sets of instructions (e.g., evaluation campaign tool 1326) embodying any one or more of the methodologies or functions described herein. The evaluation campaign tool 1326 may also reside, completely or at least partially, within the main memory 1304 and/or within the processing device 1302 during execution thereof by the computing system 1300, the main memory 1304 and the processing device 1302 also constituting computer-readable storage media. The evaluation campaign tool 1326 may further be transmitted or received over a network via the network interface device 1322.

While the computer-readable storage medium 1324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The evaluation campaign tool, components, and other features of the digital evaluation platform 101 of FIG. 1 described herein can be implemented as discrete hardware components or integrated in the functionality of hardware components such as ASICS, FPGAs, DSPs, or similar devices. The evaluation campaign module 1332 may implement operations of evaluation-assessment as described herein. In addition, the evaluation campaign module 1332 can be implemented as firmware or functional circuitry within hardware devices. Further, the evaluation campaign module 1332 can be implemented in any combination hardware devices and software components.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "analyzing," "capturing," "executing," "defining," "specifying," "selecting," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:

receiving, by a candidate evaluation system executed by a processing device, a request to create a current candidate evaluation campaign for a position sector;

selecting, by the candidate evaluation system, a first prompt from a first historical evaluation campaign associated with the position sector, the first historical evaluation campaign comprising a first data set stored in a database in a data store of the candidate evaluation system;

selecting, by the candidate evaluation system, a second prompt from a second historical evaluation campaign associated with the position sector, the second historical evaluation campaign comprising a second data set stored in the database;

accessing, within memory of the candidate evaluation system, a synonym lookup table represented as a sparse binary matrix that minimizes a memory footprint of the synonym lookup table;

identifying, by the candidate evaluation system, at least one synonym listed in the synonym lookup table that is present in the first prompt and the second prompt;

counting, by the candidate evaluation system, a number of word-based edits to transform the first prompt into the second prompt;

discounting, by the candidate evaluation system, the number of word-based edits in view of a number of synonyms of the at least one synonym, to generate a discounted number of word-based edits;

calculating, by the candidate evaluation system, a degree of similarity between the first prompt and the second prompt based on the discounted number of word-based edits;

determining, by the candidate evaluation system, whether the degree of similarity between the first prompt and the second prompt exceeds a threshold;

combining, by the candidate evaluation system in response to a determination that the degree of similarity exceeds the threshold, data from the first data set with data from the second data set to create a related cluster of prompts associated with the first prompt and with the second prompt;

analyzing, by the candidate evaluation system, the related cluster to assess a first correlation between the first prompt and an evaluation result and a second correlation between the second prompt and the evaluation result;

ranking, by the candidate evaluation system, the first prompt and the second prompt to obtain a highest ranked prompt according to the first correlation and the second correlation; and selecting, by the candidate evaluation system, the highest ranked prompt as a prompt for the current candidate evaluation campaign.

2. The method of claim 1, further comprising analyzing the related cluster to determine a relative property of importance.

3. The method of claim 2, wherein the relative property of importance comprises at least one of decisiveness qualities, predictive qualities, or competency related qualities.

4. The method of claim 2, wherein the relative property of importance comprises a competency related quality.

5. The method of claim 4, wherein the competency related quality comprises at least one of: mental and emotional stability, ability to work well with others, ability to assume leadership roles, ambition, attention to detail, problem solving, or personality.

6. The method of claim 1, wherein the analyzing the related cluster and ranking the first prompt and the second prompt further comprises calculating, by the candidate evaluation system, an importance metric for each word in each prompt of the related cluster of prompts, wherein the importance metric of each word is calculated by mapping the respective word to at least one of an evaluation rating, an evaluation outcome or result.

7. The method of claim 1, further comprising determining that the first historical evaluation campaign and the second historical evaluation campaign correspond to one or more positions in the position sector.

8. The method of claim 1, wherein the position sector is one of a sales sector, an engineering sector, an accounting sector, or a legal sector.

9. The method of claim 1, wherein the determining whether the degree of similarity between the first prompt and the second prompt exceed the threshold further comprise calculating a ratio determined by a distance between the first prompt and the second prompt divided by an average length of the first prompt and the second prompt, wherein the distance is in view of the discounted number of word-based edits.

10. A computing system comprising:
a data storage device; and
a processing device, coupled to the data storage device, to execute a candidate evaluation system to:
receive a request to create a current candidate evaluation campaign for a position sector;
select a first prompt from a first historical evaluation campaign associated with the position sector, the first historical evaluation campaign comprising a first data set stored in a database of the data storage device;
select a second prompt from a second historical evaluation campaign associated with the position sector, the second historical evaluation campaign comprising a second data set stored in the database;
access, within memory, a synonym lookup table represented as a sparse binary matrix that minimizes a memory footprint of the synonym lookup table;
identify at least one synonym listed in the synonym lookup table that is present in the first prompt and the second prompt;
count a number of word-based edits to transform the first prompt into the second prompt;
discount the number of word-based edits in view of a number of synonyms of the at least one synonym, to generate a discounted number of word-based edits;
calculate a degree of similarity between the first prompt and the second prompt based on the discounted number of word-based edits;
determine whether the degree of similarity between the first prompt and the second prompt exceeds a threshold;
combine, in response to a determination that the degree of similarity exceeds the threshold, data from the first data set with data from the second data set to create a related cluster of prompts associated with the first prompt and with the second prompt;
analyze the related cluster to assess a first correlation between the first prompt and an evaluation result and a second correlation between the second prompt and the evaluation result;
rank the first prompt and the second prompt to obtain a highest ranked prompt according to the first correlation and the second correlation; and
select the highest ranked prompt as a prompt for the current candidate evaluation campaign.

11. The computing system of claim 10, wherein the candidate evaluation system is further to analyze the related cluster to determine a relative property of importance, wherein the relative property of importance comprises a competency related quality.

12. The computing system of claim 10, wherein the degree of similarity is a ratio determined by the discounted number of word-based edits between the first prompt and the second prompt divided by an average length of the first prompt and the second prompt.

13. The computing system of claim 10, wherein the candidate evaluation system is to determine that the first historical evaluation campaign and the second historical evaluation campaign correspond to one or more positions in the position sector.

14. A non-transitory storage medium storing instructions that when executed by a processing device cause the processing device to perform operations comprising:
receiving, by the processing device, a request to create a current candidate evaluation campaign for a position sector;
selecting, by the processing device, a first prompt from a first historical evaluation campaign associated with the position sector, the first historical evaluation campaign comprising a first data set stored in a database in a data store;
selecting, by the processing device, a second prompt from a second historical evaluation campaign associated with the position sector, the second historical evaluation campaign comprising a second data set stored in the database;
accessing, within memory, a synonym lookup table represented as a sparse binary matrix that minimizes a memory footprint of the synonym lookup table;
identifying, by the processing device, at least one synonym listed in the synonym lookup table that is present in the first prompt and the second prompt;
counting, by the processing device, a number of word-based edits to transform the first prompt into the second prompt;
discounting, by the processing device, the number of word-based edits in view of a number of synonyms of the at least one synonym, to generate a discounted number of word-based edits;
calculating, by the processing device, a degree of similarity between the first prompt and the second prompt based on the discounted number of word-based edits;

determining, by the processing device, whether the degree of similarity between the first prompt and the second prompt exceeds a threshold;

combining, by the processing device in response to a determination that the degree of similarity exceeds the threshold, data from the first data set with data from the second data set to create a related cluster of prompts associated with the first prompt and with the second prompt;

analyzing, by the processing device, the related cluster to assess a first correlation between the first prompt and an evaluation result and a second correlation between the second prompt and the evaluation result;

ranking, by the processing device, the first prompt and the second prompt to obtain a highest ranked prompt according to the first correlation and the second correlation; and selecting, by the processing device, the highest ranked prompt as a prompt for the current candidate evaluation campaign.

15. The non-transitory storage medium of claim 14, wherein the operations further comprise analyzing the related cluster to determine a relative property of importance, wherein the relative property of importance comprises a competency related quality.

16. The non-transitory storage medium of claim 14, wherein the analyzing the related cluster and ranking the first prompt and the second prompt further comprises calculating an importance metric of each word in each prompt of the related cluster of prompts, wherein a relative importance metric of each word is calculated by mapping the respective words to at least one of an evaluation rating, an evaluation outcome or result.

17. The non-transitory storage medium of claim 14, wherein the determining whether the degree of similarity between the first prompt and the second prompt exceed the threshold further comprise calculating a ratio determined by a distance between the first prompt and the second prompt divided by an average length of the first prompt and the second prompt, wherein the distance is in view of the discounted number of word-based edits.

18. The non-transitory storage medium of claim 14, wherein the operations further comprise:

identifying which groups of similar prompts perform the best for a particular performance metric or competency; and after the identifying which groups of similar prompts perform the best, automatically recommending the same group of similar prompts for a subsequent evaluation campaign pursuing a similar outcome for the particular performance metric or competency.

\* \* \* \* \*